(12) United States Patent
Hoch et al.

(10) Patent No.: US 12,319,239 B2
(45) Date of Patent: Jun. 3, 2025

(54) MOUNTING SYSTEM FOR SECURING ITEMS TO VEHICLE

(71) Applicant: HOCH BRANDS LLC, Boca Raton, FL (US)

(72) Inventors: Charles V. Hoch, Durango, CO (US); Bruce A. Hoch, Durango, CO (US)

( * ) Notice: Subject to any disclaimer, the term of this patent is extended or adjusted under 35 U.S.C. 154(b) by 263 days.

(21) Appl. No.: 17/884,957

(22) Filed: Aug. 10, 2022

(65) Prior Publication Data
US 2023/0049944 A1    Feb. 16, 2023

Related U.S. Application Data

(60) Provisional application No. 63/232,097, filed on Aug. 11, 2021.

(51) Int. Cl.
*B60R 9/02* (2006.01)

(52) U.S. Cl.
CPC ..................... *B60R 9/02* (2013.01)

(58) Field of Classification Search
CPC .............. B60R 9/02; B60R 9/06; B60R 9/065
USPC .................................. 224/403, 404
See application file for complete search history.

(56) References Cited

U.S. PATENT DOCUMENTS

| | | | | |
|---|---|---|---|---|
| 1,280,362 A * | 10/1918 | Alveson | ..................... | B60R 9/02 224/42.32 |
| 3,876,078 A * | 4/1975 | Gomes | .................. | A47B 81/005 248/231.71 |
| 4,116,373 A * | 9/1978 | Bryngelson | ............ | B62D 43/02 414/463 |
| 4,728,017 A * | 3/1988 | Mullican | .................. | B60R 9/00 224/543 |
| 5,588,631 A * | 12/1996 | Yee | ......................... | B60R 11/06 224/547 |
| 6,024,402 A * | 2/2000 | Wheatley | ................. | B60J 7/102 224/403 |
| 6,059,159 A * | 5/2000 | Fisher | ...................... | B60R 9/00 224/403 |
| 6,766,913 B2 * | 7/2004 | Steen | ..................... | B68C 1/002 224/403 |
| 8,157,229 B2 * | 4/2012 | Palermo | ................ | B60P 7/0815 224/403 |
| D702,620 S * | 4/2014 | Read | ............................ | D12/223 |
| 9,840,205 B1 * | 12/2017 | Marquez | ................... | B60R 9/02 |
| 10,106,095 B1 * | 10/2018 | Farr | ....................... | B60R 11/00 |

(Continued)

OTHER PUBLICATIONS

Glass Racking Systems Product Page, Metalcraft Engineering Company Ltd., 2017, Retrieved from http://www.theglassrackingcompany.com/us_glass_racking/pick_ups/a_frames.

(Continued)

*Primary Examiner* — Justin M Larson
(74) *Attorney, Agent, or Firm* — Dorsey & Whitney LLP

(57) ABSTRACT

A mounting system for removably attaching components to a vehicle having a bed portion, the bed portion including at least one sidewall defining a top rim, the mounting system including a mounting assembly. The mounting assembly is configured to be secured to the sidewall and to support a load; a load support structure, wherein the load support structure is configured to couple to the mounting assembly; an engagement between the mounting assembly and the load support structure being positioned at or below the top rim of the sidewall.

18 Claims, 22 Drawing Sheets

(56) References Cited

U.S. PATENT DOCUMENTS

| | | | | |
|---|---|---|---|---|
| 10,343,587 | B2* | 7/2019 | Frazier | B60P 7/0815 |
| 10,427,614 | B2* | 10/2019 | Marchlewski | B60R 9/00 |
| 10,464,466 | B2* | 11/2019 | Line | B60P 7/0815 |
| 10,780,836 | B1* | 9/2020 | Fisher | B60R 9/02 |
| 10,882,458 | B2* | 1/2021 | Laborde, Jr. | F41C 33/005 |
| 10,933,796 | B2* | 3/2021 | Beenen | B60R 5/04 |
| 11,267,406 | B2* | 3/2022 | Deighton | B60P 7/10 |
| 11,440,479 | B2* | 9/2022 | Salter | B60P 7/15 |
| 2003/0094471 | A1* | 5/2003 | McNalley | F41B 5/14 224/403 |
| 2008/0087785 | A1* | 4/2008 | Roche | A47B 81/005 248/309.4 |
| 2009/0014602 | A1* | 1/2009 | Frost | B60R 7/08 248/100 |
| 2011/0204110 | A1* | 8/2011 | Read | B60R 9/065 224/560 |
| 2020/0398905 | A1* | 12/2020 | Schuling | B60P 7/15 |
| 2021/0031841 | A1* | 2/2021 | Kananda | B62D 33/0207 |
| 2021/0138954 | A1* | 5/2021 | Beenen | B60R 7/02 |
| 2021/0213887 | A1* | 7/2021 | Deighton | B62D 33/0207 |
| 2023/0049944 | A1* | 2/2023 | Hoch | B60R 9/02 |

OTHER PUBLICATIONS

Photographs of JEEP® Rubicon with above bed rail.
Realtruck, "Truxedo Truck Luggage Saddlebag Cargo Bag", https://realtruck.com/p/truxedo-truck-luggage-saddlebag-cargo-bag/trx-1705213/?utm_source=google&utm_source=google&utm_medium=organic&utm_medium=cpc&utm_campaign=free-pla&utm_campaign=Tool%20Boxes%20-%20Smart%20Shopping&utm_content=surfaces&kpid=go_cmp-.
Rightline Gear, "Rightline Gear Car Back Carrier", https://www.lowes.com/pd/Rightline-Gear-Car-Back-Carrier/1002309238?cm_mmc=shp-_-c-_-prd-_-hdw-_-google-_-pla-_-214-_-sostrailerrampsandtowing-_-1002309238-_-0&placeholder=null&gclid=EAIaIQobChMIr5Wg-_6E7AIVJQnnCh30iQGPEAQYAyABEgJrhvD_BwE&gclsrc=aw.ds.
Softopper, "Datin Fab® Canvas Cage Rack", https://softopper.com/products/datin-fab-canvas-cage-rack-ac-tun65/?sku=AC-TUN65-STD?sku=AC-TUN65-STD&gclid=Cj0KCQjwrs2XBhDjARIsAHVymmTReFhAmV3OBYvNIr2Npikoa7FqkYxs4N8eMIvh3QxTrwKnSq3E7g0aAqiAEALw_wcB.
Truck Hero, "Truck Luggage Saddlebag Cargo Bag", Retrieved from https://truck-hero.com/truck-luggage-saddlebag.
Victory 4X4, "Roof Rack Side Accessory Panel", https://www.victory4x4.com/product/VRK-SAP.html?gclid=Cj0KCQjwrs2XBhDjARIsAHVymmTZb_Fd0vX5A2HrX-sKBMY5AcnPpsG0z0EGtWrbAYZRJ1iZywpJc34aAnYQEALw_wcB.
Google Image Search Results for Roughrider Saddlebag retrieved on Aug. 1, 2022, retrieved from https://images-na.ssl-images-amazon.com/images/I/31jwhb%2BajyL._AC_UL474_SR474,450_.jpg.
Autoplicity, "Vertically Driven Products 31300 Exterior Accessories", https://autoplicity.com/60997-vertically-driven-products-31300-exterior-accessories?utm_source=google&utm_medium=surfaces&utm_campaign=shopping&gclid=EAIaIQobChMI7c6DmoCF7AIV2z2tBh1c1Q2IEAQYHyABEgLsnfD_BwE.
Cali Raised LED, "2005-2022 Toyota Tacoma Bed Molle System", https://caliraisedled.com/products/2005-2021-toyota-tacoma-bed-molle-system?variant=14918691946538&currency=USD&utm_medium=product_sync&utm_source=google&utm_content=sag_organic&utm_campaign=sag_organic&gclid=Cj0KCQjwrs2XBhDjARIsAHVymmTMlau3l12qHcZvy0i.
Ebay, "20L Portable Fuel Tank Cans Oil Storage Gas Can Storage Container Jeep ATV UTV", https://www.ebay.com/itm/133931506262?chn=ps&_trkparms=ispr%3D1&amdata=enc%3A1qgOUtYbdQ4WQwhuZy7153w77&norover=1&mkevt=1&mkrid=711-117182-37290-0&mkcid=2&itemid=133931506262&targetid=1644837435963&device=m&mktype=&googleloc=9029145&poi=&campaignid.
Google, "Search Results for Exterior Truck Bags", https://www.google.com/search?q=exterior+truck+bags&client=safari&rls=en&source=lnms&tbm=isch&sa=X&ved=2ahUKEwjwZi2_oTsAhVQrJ4KHfPND-EQ_AUoAnoECA8QBA&biw=1440&bih=769&dpr=2.
Google, "Search Results for Wheel Well Truck Storage Exterior", https://www.google.com/search?q=wheel+well+truck+storage+exterior&tbm=isch&ved=2ahUKEwjdqYHgglXsAhXkGTQIHQAbBZUQ2-cCegQIABAA&oq=wheel+well+truck+storage+exterior&gs_lcp=CgNpbWcQAzOGCAAQCBAeUKniAVi-6wFgn_ABaABwAHgAgAFhiAG1BJIBATmYAQCgAQGqAQtnd3Mtd216LWltZ8.
Hornet Outdoors, "UTV Dual Tool Roll Bar Fiskars Shovel and Gerber Axe Roll Bar Kit", https://www.shophornetoutdoors.com/UTV-Dual-Tool-Roll-Bar-Shovel-and-Axe-Mount-Kit_p_382.html?gclid=Cj0KCQjwrs2XBhDjARIsAHVymmRull7lyF7uVG8DMRsXS0881RdUi54g_kRWfTIcU48htqL_YEQDBHQaAt2aEALw_wcB.
Jcroffroad Inc, "Dual Jerry Can Carrier | Adventure Carrier", https://www.jcroffroad.com/product/UNI-DJC-PC.html?gclid=Cj0KCQjwrs2XBhDjARIsAHVymmTLWLnas_JfwJypz_NG2zkj6qHCYASVm6JfOTELzE2EA5IVWhDlztQaAmPFEALw_wcB.
LaReau, "General Motors, Ram Built Secret Storage Spaces Into New Pickups" Detroit Free Press, Oct. 11, 2018, 5 pages.
Lowe's, "Rightline Gear Side Storage Bags", https://www.lowes.com/pd/Rightline-Gear-Side-Storage-Bags/1001465892?cm_mmc=shp-_-c-_-prd-_-hdw-_-google-_-pla-_-214-_-sostrailerrampsandtowing-_-1001465892-_-0&placeholder=null&gclid=EAIaIQobChMI7ITOvf6E7AIVgRh9Ch0VvQgTEAkYDCABEglHLfD_BwE&gclsrc=aw.ds.
Offroad Alliance, , "2 Gallon Gasoline (Gen 2)", https://offroadalliance.com/products/rotopax-2-gallon-gen-2-gas-container/?utm_source=googleshopping&utm_medium=cse&sku=ROT5%7CRXX-2G&gclid=Cj0KCQjwrs2XBhDjARIsAHVymmSnNHKjTd583_yFHB43jb97tSIZs4FSzFvWhGoxMAn4XWBTZ_pBkoEaAtSTEALw_wcB.
QVC, "Rightline Gear Side Storage Bag", https://www.qvc.com/Rightline-Gear-Side-Storage-Bag.product.H370244.html?colorId=000&sizeId=000&ref=GBA&cm_mmc=GOOGLESHOPPINGFEED-_-GShopping%7CM%7CGeneric%7Chome+improvement-_-Home+Improvement-_-dc_44906292187_pla-865475923598_H370244-000-000&cm.

* cited by examiner

MOUNTING SYSTEM FOR SECURING ITEMS TO VEHICLE

CROSS-REFERENCE TO RELATED APPLICATIONS

This application claims the benefit of priority pursuant to 35 U.S.C. § 119(e) of U.S. provisional patent application No. 63/232,097, filed Aug. 11, 2021, entitled "MOUNTING SYSTEM FOR SECURING ITEMS TO VEHICLE" which is hereby incorporated by reference herein in its entirety.

FIELD

This disclosure relates generally to mounting systems and methods for securing items to vehicles.

BACKGROUND

Existing methods and systems of securing cargo to vehicles, such as pickup trucks, have numerous deficiencies. For example roof racks are hard to reach. Hitch mount racks interfere with the use of the tailgate and place cargo in the path of mud and dirt kicked up by the vehicle. Improved solutions are desired that can enable easy access to cargo and to the tailgate and doors of the vehicle.

BRIEF SUMMARY

In some examples, a mounting system for removably attaching components to a vehicle including at least one sidewall defining a top rim, the mounting system includes a mounting assembly, wherein the mounting assembly is configured to be secured to the sidewall and to support a load; a load support structure, wherein the load support structure is configured to couple to the mounting assembly; and an engagement between the mounting assembly and the load support structure being positioned at or below the top rim of the sidewall. Additionally or alternatively, the vehicle may include a bed portion, where the bed portion includes the at least one sidewall defining a top rim.

In addition or alternatively, the mounting assembly may include a bracket, the bracket including a top portion, wherein the top portion is configured to be secured to the sidewall, a lower portion, wherein the lower portion defines one or more receiving portions, the one or more receiving portions defining one or more features to support one or more loads or load support structures, and an intersection portion, wherein the intersection portion defines a location where the top portion and lower portions intersect.

Additionally or alternatively, the lower portion of the mounting assembly may comprises a brace member defining a supporting feature extending from the lower portion in a direction of the sidewall.

Alternatively or additionally, the intersection portion may be reinforced by a structure, the structure spanning from the top portion to the lower portion of the bracket.

Alternatively or additionally, the intersection portion is adjustable such that a position of the lower portion may be repositioned relative to a position of the top portion.

Additionally or alternatively, the mounting assembly may also include an adjustment mechanism, the adjustment mechanism including a top plate defining at least one adjustment aperture, a bottom plate configured to define at least one corresponding adjustment aperture, wherein the top portion of the bracket is configured to define at least one corresponding adjustment aperture, and an elongated recess configured to receive the top portion of the bracket, wherein by orienting the at least one adjustment aperture of the top portion of the bracket with the at least one adjustment aperture of the bottom plate and inserting at least one fastener, the bracket may be placed in at least one position relative to the sidewall. Additionally or alternatively, the at least one adjustment aperture of the top portion of the bracket is laterally spaced away from the sidewall. Additionally or alternatively, a portion of a topper is positioned on the sidewall, and wherein the at least one adjustment aperture is accessible.

Additionally or alternatively, the top portion is configured to define apertures, the apertures configured to receive fasteners, the fasteners configured to secure the bracket directly to the sidewall.

Additionally or alternatively, the load support structure defines one or more utility portions, the utility portion configured to support a load.

Additionally or alternatively, the load support structure further includes one or more utility portions, the utility portions configured to support a load, and one or more coupling portions, the coupling portions configured to mate with the receiving portion of one or more brackets.

Alternatively or additionally, the load support structure spans between two or more mounting assemblies.

Additionally or alternatively, the mounting assembly may include a securement mechanism, wherein the securement mechanism is configured to secure the mounting assembly to the sidewall.

Additionally, the securement mechanism is configured to removably couple to the sidewall, the securement mechanism further comprising a slider member, the slider member configured to rest in apertures defined by the top portion of the bracket, the slider member further configured to define an aperture; a clamp member; the clamp member configured to couple to a feature on the sidewall; the clamp member further defining an aperture; and a rod, wherein the rod is configured to extend through the clamp member and into the slider member, and the rod causes the slider member to exert force on the top portion of the bracket, and the clamp member to exert force on the sidewall, thereby securing the mounting assembly to the sidewall.

Alternatively or additionally, wherein the mounting assembly further includes an adjustment mechanism, the adjustment mechanism may include the slider member, the slider member configured to rest within apertures defined by the top portion of the bracket, the apertures configured to define tracks, the tracks configured to allow the slider member to rest in multiple positions within the tracks, and wherein a location of the bracket may be adjusted relative to the sidewall and secured into a location when the slider member exerts an applied force on the top portion of the bracket through the tracks.

Alternatively or additionally, the securement mechanism may include a multi-layer assembly, the multi-layer assembly including a bottom plate configured to rest on the rim of the sidewall and to define one or more securement apertures, a top plate configured to define corresponding securement apertures, a recess between the top plate and the bottom plate, the recess configured to receive the top portion of the bracket, and one or more adjustment apertures, the adjustment apertures configured to be placed above the recess, and wherein fasteners inserted into the securement apertures couple the multi-layer assembly to the sidewall, and fasteners inserted into the one or more adjustment apertures secure the bracket within the multi-layer assembly.

Additionally or alternatively a plurality of adjustment apertures may be included, the plurality of adjustment apertures configured to secure the bracket in multiple positions relative to the sidewall.

Additionally or alternatively, the mounting assembly may also include an adjustment mechanism, the adjustment mechanism including a slider member, configured to rest within apertures defined by the top portion of the bracket, the apertures configured to define tracks, the tracks configured to allow the slider member to rest in multiple positions within the tracks, and wherein a placement of the bracket may be adjusted relative to the sidewall and secured into the location when the slider member exerts an applied force on the top portion of the bracket through the tracks.

Additionally or alternatively, the tracks are further configured to define teeth, the teeth configured to be structures that define discrete locations for the slider member to rest.

Additionally or alternatively, the slider member further includes features that increase the applied force on the top portion of the bracket.

In another example, a mounting system for removably attaching utility components to a vehicle having a bed portion, the bed portion including at least one sidewall defining a top rim, the mounting system includes a mounting assembly including a bracket, a securement mechanism, and an adjustment mechanism, the securement mechanism securing the mounting assembly to the sidewall, the adjustment mechanism allowing positioning of the mounting assembly relative to the sidewall; a load support structure including one or more utility portions and one or more coupling portions, the coupling portion for removably connecting the fixture to the bracket of the mounting assembly; and the engagement between the bracket and the coupling portion being positioned at or below the top rim of the sidewall.

In another example, the mounting system for removably attaching components to a vehicle having a bed portion, the bed portion including at least one sidewall defining a top rim, the mounting system including a mounting assembly including a bracket, and a securement mechanism, the bracket configured to support a load, the securement mechanism securing the mounting assembly to the sidewall, and the engagement between the mounting assembly and the load being positioned at or below the top rim of the sidewall.

Additional embodiments and/or features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure. One of skill in the art will understand that each of the various aspects and features of the disclosure may advantageously be used separately in some instances, or in combination with other aspects and features of the disclosure in other instances.

DETAILED DESCRIPTION OF DRAWINGS

DETAILED DESCRIPTION

Figure 1A:
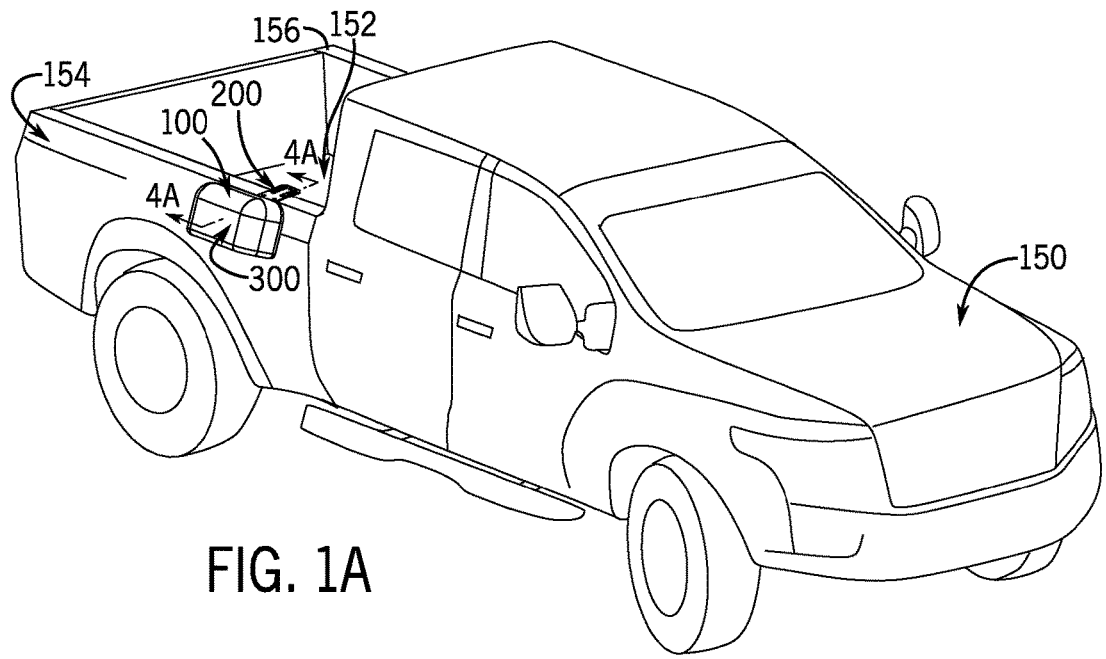
FIG. 1A shows a front, right perspective view of a truck with an example of the mounting system attached.
Figure 1B:
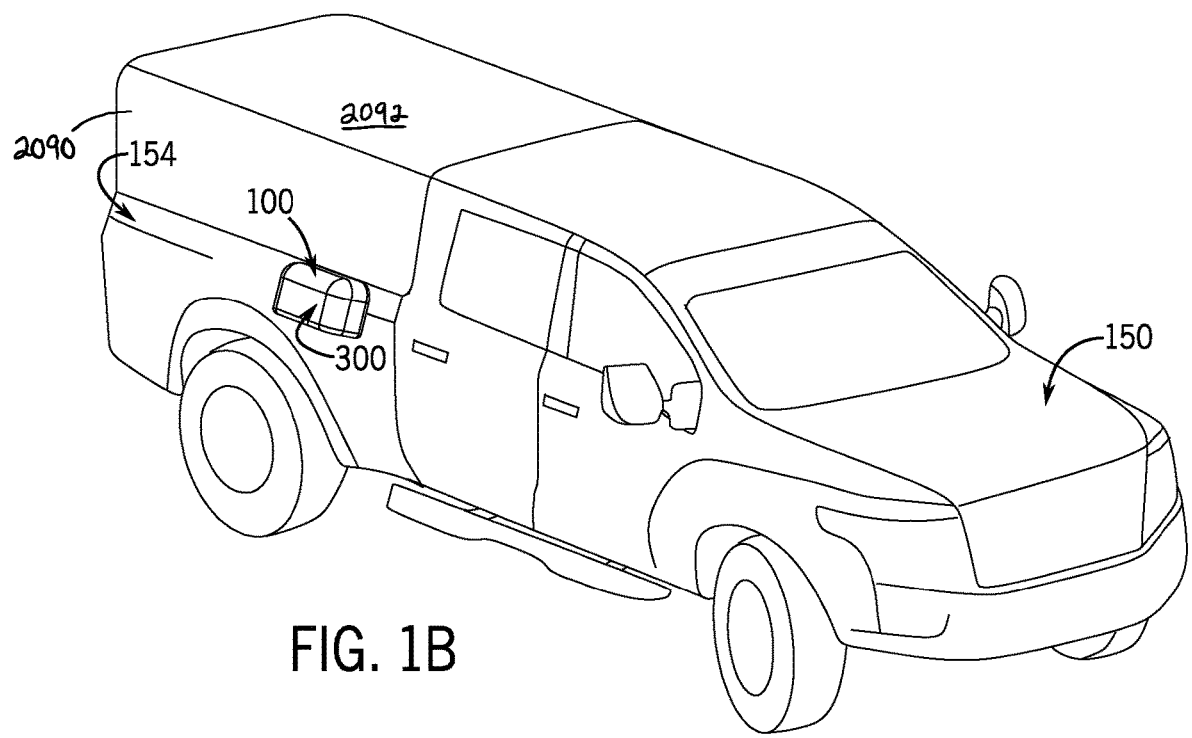
FIG. 1B shows a front, right perspective view of a truck having a topper with an example of the mounting system attached.
Figure 2:
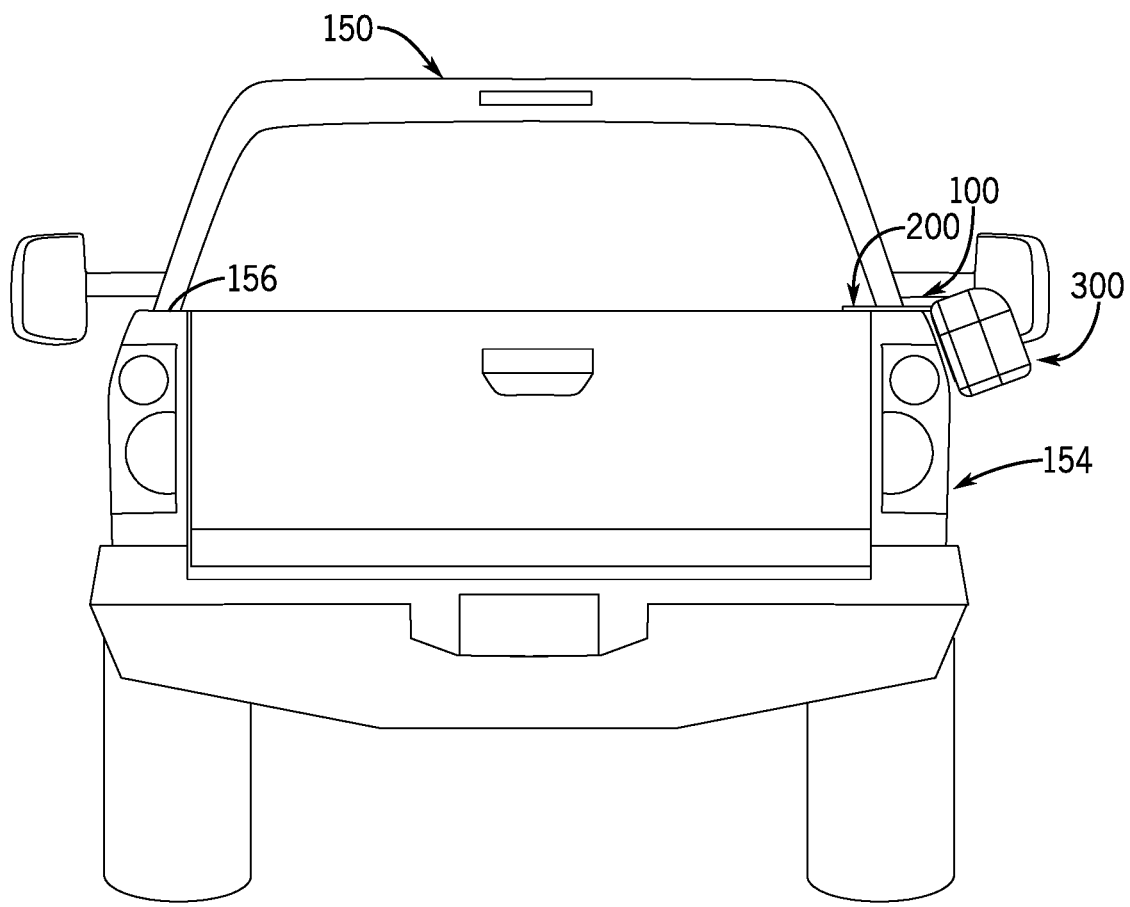
FIG. 2 shows a rear elevation view of a truck with an example of the mounting system attached.

The present disclosure generally provides for a mounting system 100 for coupling components to the exterior of a bed 152 of a vehicle 150. In one example, as shown in FIGS. 1A, 1B, 2 and 4A, the vehicle bed 152 may in one example be a truck bed 152. The vehicle bed may include at least one sidewall 154, the sidewall 154 may have an inside wall and an outside wall. In general with respect to this description, an outward direction is a direction away from the interior of the truck bed 152 and an inward direction is a direction towards the interior of the truck bed 152. The top portion of the sidewall 154 is the rim 156, which may include a flange 158, best shown in FIGS. 4A and 4B, extending downwardly from the inside edge of the rim 156. The truck may have a truck bed cover (also referred to as a topper), such as is shown in FIG. 1B.

The mounting system 100 includes a mounting assembly 200 attached to the vehicle, and notably to the vehicle bed, such as the sidewall 154 with a supporting structure positioned on the outside of the sidewall 154 and extending below the rim 156 so that an engagement location 226 between the mounting assembly 200 and any load 325 attached thereto is at or below the top rim 156 of the sidewall 154. The mounting assembly 200 is attached to the sidewall 154 in such a way as to allow other components to be mounted in or on the bed 152 of the truck 150, including on the top rim 156 of the sidewall 154. With the supporting structure positioned on the outside of the sidewall 154, gear or other stowage may be carried by the vehicle 150 and conveniently accessed while other objects may be positioned in the bed and/or on the top of the sidewall. Further, additional storage capacity is added to the vehicle 150 while the usefulness of the bed of the vehicle 150 is maintained. One example of the mounting system 100 includes a mounting assembly 200 and one or more load support structures 300. Load support structures 300 include any load 335 or component 302 that may be attached or that may support, contain, store, or allow a load to be supported by the mounting assembly 200. The load support structure 300 may be removable from the mounting assembly 200 or it may be permanently affixed to the mounting assembly 200.

Figure 3:
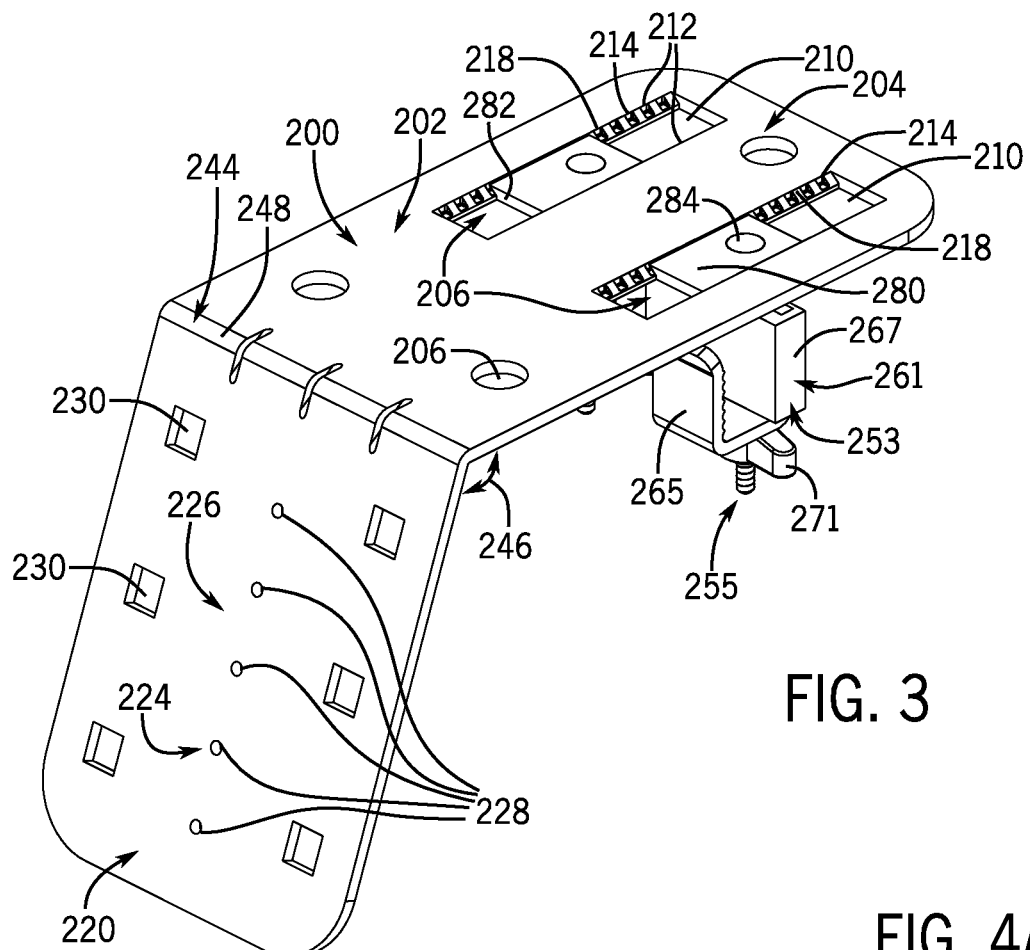
FIG. 3 shows a perspective view of an example of the mounting assembly.

FIG. 3 shows an example of the mounting assembly 200. The mounting assembly 200 includes a bracket 202 configured to extend outward from the sidewall 154 and to receive a load support structure 300, a securement mechanism 253 to removably attach the mounting assembly 200 to the sidewall 154, as shown in FIG. 4, and an adjustment mechanism 275 to extend or retract the bracket 202 relative to the rim 156 of the sidewall 154. In this example, the securement mechanism 253 attaches the mounting assembly 200 to the flange portion 158 of the sidewall 154. In this example, the mounting system 100 has a reduced vertical profile and allows for additional vehicle attachments, such as for an example a truck bed cover (also referred to as a topper), to be placed on the rim 156 and over the top of the mounting system 100, without substantially interfering with the function of the truck bed cover, such as its seal to the sidewalls 154 of the bed. In additional examples, as are further described below, the securement mechanism 253 may permanently attach the mounting assembly 200 to the sidewall 154. In some examples, the securement mechanism 253 may releasably attach the mounting assembly to the sidewall 154. In additional examples, as are further described below, the adjustment mechanism 275 may not be included, in which case there is no adjustment relative to the sidewall 154 of the bed. In other examples, the adjustment mechanism 275 and/or securement mechanism 253, separately or together, are configured to reduce portions of the mounting assembly 200 that extend inwardly toward the interior of the truck bed 152, allowing for the full volume of the truck bed 152 to be used more conveniently. For instance, this may allow the use of truck bed campers received within the truck bed 152. Other examples may have a reduced vertical profile as well as reduced or no portions extending into the bed 152 of the truck 150. Further benefits of the invention include at least that the user can still access the bed 152 conveniently, the load support structure 300 is positioned at a height convenient for a user to access, loads 335 may be transported that would otherwise be too large to be contained by the volume of the vehicle bed 152, and the total storage and utility capacity of the vehicle 150 is increased.

FIGS. 3 through 7 show an example of the bracket 202. The bracket 202 includes a top portion 204 positioned on the top of the rim 156 of the sidewall 154, a lower portion 220 extending downward to a point below the rim 156 of the sidewall 154, and an intersection portion 244 where the top portion 204 and the lower portion 220 intersect. In this example, the top portion 204 rests on the top of the rim 156 of the sidewall 154 and interfaces with a slider member 280, the slider member 280 is a component of both the securement mechanism 253 and the adjustment mechanism 275, assists with both securing the bracket 202 to the sidewall 154 of the truck bed and in positioning the bracket 202 relative to the sidewall 154. The top portion 204, lower portion 220, and the intersection portion 244 may be defined as one piece, or each portion may be one or more pieces that mate to form the bracket 202. The bracket 202 may be a thin metal plate throughout, or the bracket 202 may be assembled from one or more materials in a variety of shapes and sizes sufficient to support a load at a position at or below the rim 156 of the truck bed.

In this example, the top portion 204 defines one or more apertures 206. In this example each aperture 206 is an elongated slot 210 defined by opposing lateral sidewalls 212 and opposing end walls. Each slot 210 is located adjacent to and may extend beyond the inside edge of the top portion 204. A track 214 may be defined on one or both of each opposing lateral sidewall 212. The tracks 214 are configured to receive the slider member 280 that may be positioned along the length of the slot 210 and engage the tracks 214, as described below with respect to one example of the adjustment mechanism 275. The track 214 portions may define a series of teeth 218 extending along at least a portion of the length of the track 214 to engage corresponding teeth 218 optionally formed on the corresponding slider, which reduces the movement of the slider in the respective slot 210, and thus the bracket 202 position relative to the sidewall 154.

The bracket 202 is secured to the sidewall 154 of the truck bed 152 in this example by a securement mechanism 253. The securement mechanism 253, as explained below, exerts a force on the slider member 280, causing the slider member 280 to exert a force on the tracks 214 of the slots 210 and fix its position along the length of the slot 210, and hold the bracket 202 in position relative to the sidewall 154. If teeth 218 are present in the tracks 214, the slider member 280 may be configured to engage the teeth 218 of the tracks 214 to further reduce movement.

Figure 19:
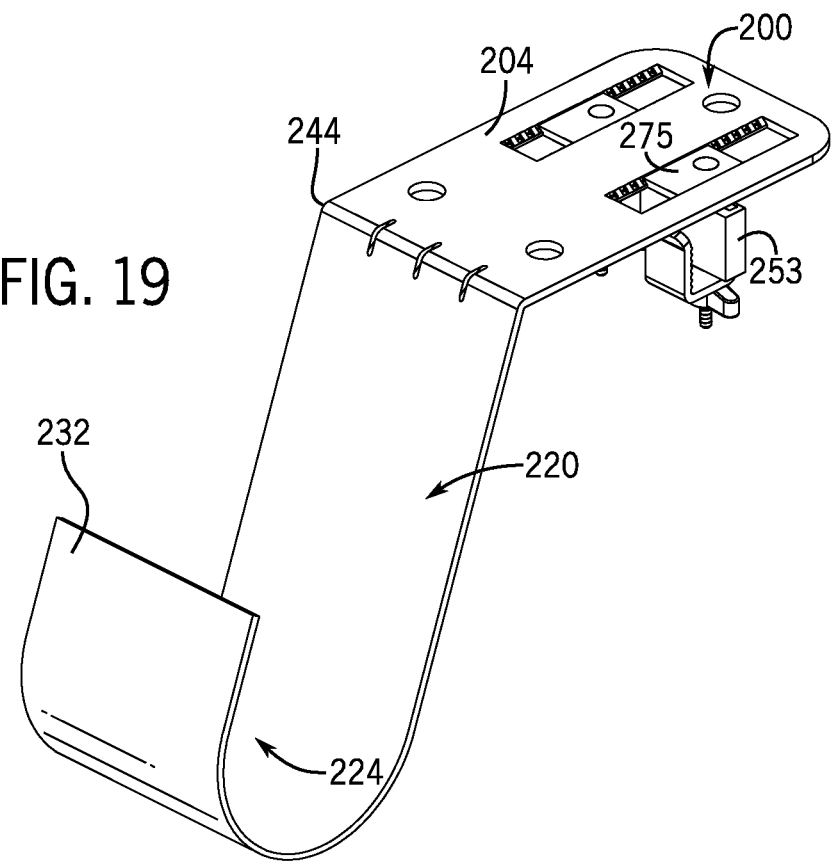
FIG. 19 shows an example of the mounting assembly configured to directly receive a load.

The lower portion 220 of the bracket 202 connects with the top portion 204 of the bracket 202 at an intersection portion 244. The lower portion 220 may be configured to extend at an angle Alpha (α) 246 both downward below the top rim 156 of the sidewall 154 as well as outwardly away from the sidewall 154 to form a gap 234 between the sidewall 154 and the bracket 202. The gap 234 may help to reduce contact between the lower portion 220 and the sidewall 154 of the truck 150. The lower portion 220 may be configured to define a receiving portion 224 defining an engagement location 226 where a load 335 or load support structure 300 is secured. The receiving portion 224 may define, in this example, one or more apertures 228 to releasably receive a corresponding coupling fastener 323 or feature on a load support structure 300. In the example shown in FIG. 3, two apertures 228 defined by the receiving portion 224 are configured to couple the load support structure 300 to the bracket 202. The apertures 228 may define threaded holes that correspond to coupling fasteners 323 on a load support structure 300, further described below with respect to FIG. 5, so as to couple the load support structure 300 to the bracket 202, and thus to the mounting assembly 200 as a whole. In other examples, the apertures 230 may not be threaded 232 or there may be a sufficient number of receiving portions 224 to couple more than one load support structure 300 to the lower portion 220. The apertures 228 or the receiving portion 224 may also be shaped to support a load without a fastener 323, such as being a hook 232 or clamping structure as shown by FIG. 19. Some examples may or may not use coupling fasteners 323 to secure load support structures 300 to the receiving portion 224. In other examples, multiple receiving portions 224 may define multiple engagement locations. The multiple receiving portions 224 may include multiple aperture 228 locations or multiple features on the lower portion 220, such as a plurality of hooks 232, ledges or clamps.

Figure 4A:
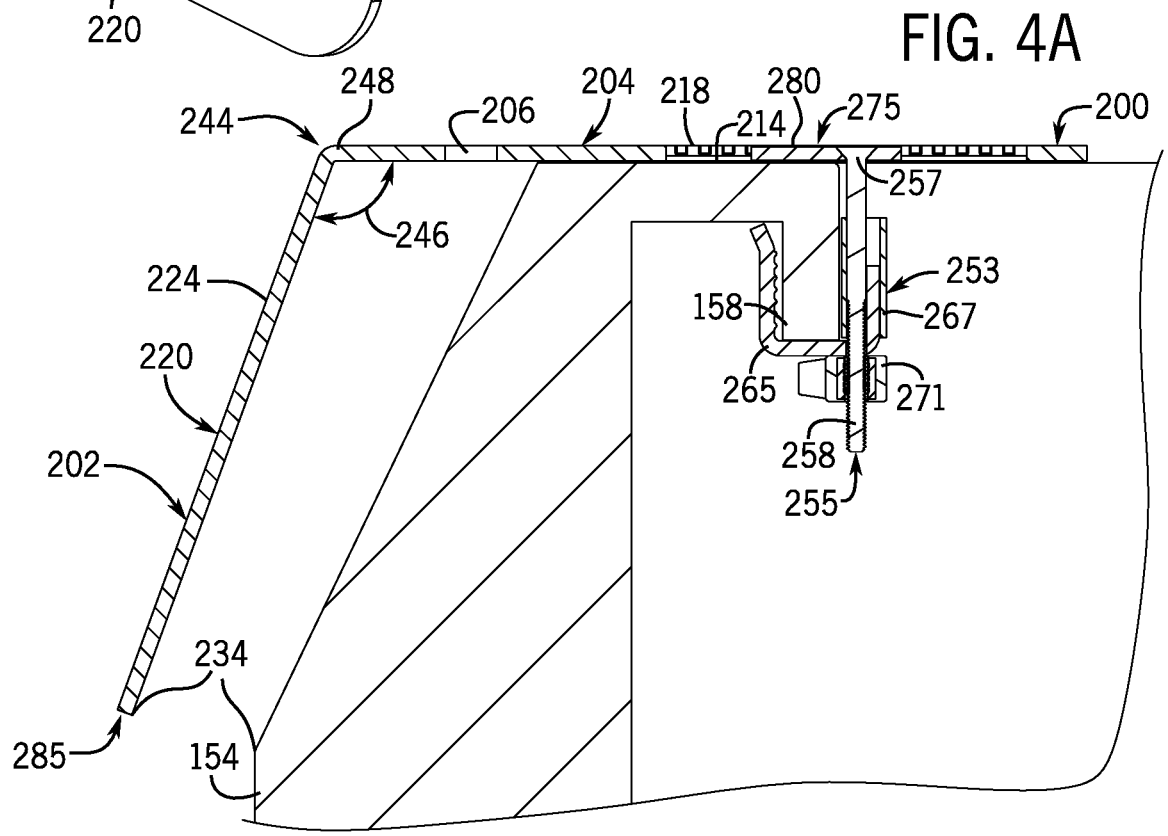
FIG. 4A shows a side elevation view of an example of the mounting assembly secured to the flange of the sidewall.

The intersection portion 244 of the bracket 202 defines where the lower portion 220 and the top portion 204 intersect, see FIGS. 3 and 4A. In examples where the bracket 202 is one piece, the intersection may be defined by a change of direction or a bend 248 in the bracket 202. The change in direction or bend 248 defining the intersection portion 244 may be a discrete angle, a bend 248 to reduce the concentration of forces at the bend 248, or any other geometric relation sufficient to define a change of direction between the top portion 204 and the lower portion 220. In examples where the bracket 202 is formed of multiple pieces, the intersection portion 244 may be the location where the pieces that define the top portion 204 interface with the pieces defining the lower portion 220. In one example, the intersection portion 244 defines an angle Alpha (α) 246 between the top portion 204 and the lower may range from about 90 to about 180 degrees in order to form a gap 234 between the lower portion 220 and the sidewall 154 of the bed. A range of approximately 100 degrees and greater has been found to generally form a gap 234 between the lower portion 220 and the sidewall 154 and support a load 335, though more acute or obtuse angles may also be sufficient. In a range of about 100 to 120 degrees, there is a gap 234 defined between the lower portion 220 of the bracket 202 and the sidewall 154 while keeping the load relatively close to the sidewall, and in some examples flush to or inside the lateral extension of the side mirrors on the vehicle. The gap 234 may be sufficient to reduce the risk of the bracket 202 (or bracket 202 and any load attached to the bracket 202) deflecting into the sidewall 154 when the bracket 202 is subjected to a force, such as when the vehicle 150 passes over a pot hole on a roadway. The intersection portion 244 may further define an adjustable joint 502 to allow the orientation of the lower portion 220 to be changed relative to the top portion 204, angle Alpha (α) 246 to allow for a wider variety of trucks and loads to be compatible with the mounting assembly 200.

Figure 18:
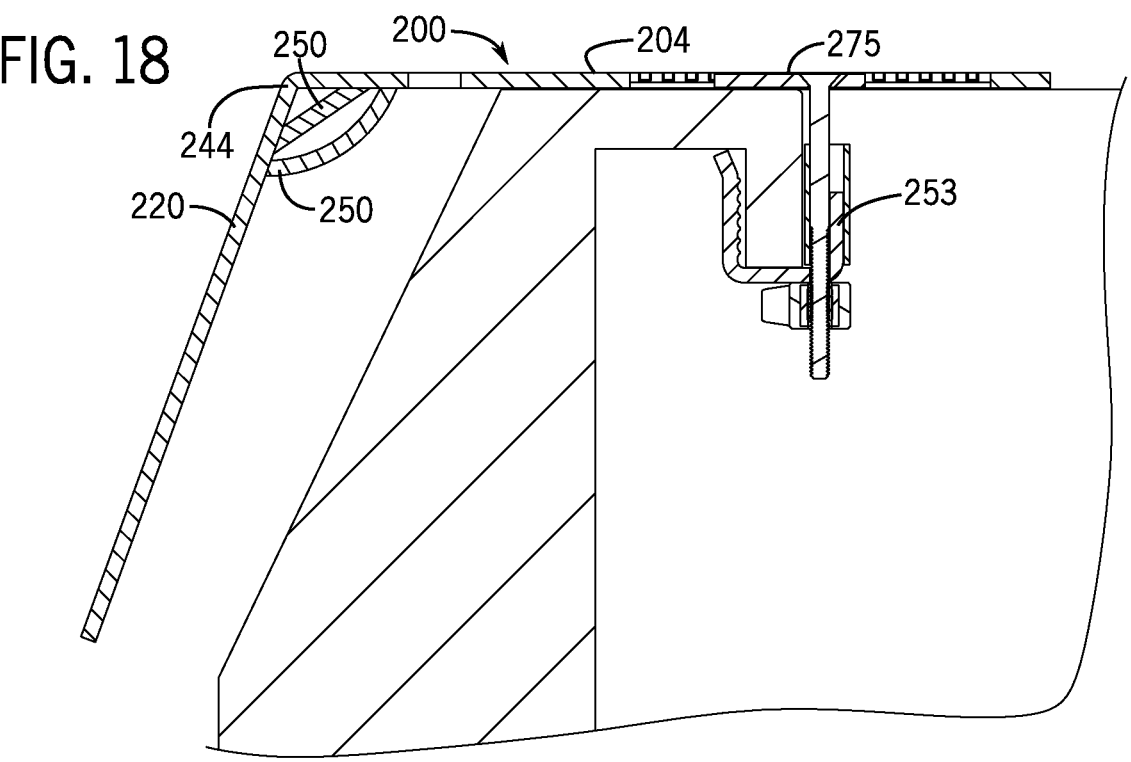
FIG. 18 shows an example of the mounting assembly with a reinforcement member.

In other examples, as shown in FIG. 18, the intersection portion 244 may include a reinforced member 250 to reduce the possible deflection of the lower portion 220 relative to the top portion 204. For example, strut members 250 may extend across the intersection portion 244 from the lower portion 220 to the top portion 204. This reinforcing supporting structure may reduce the degree to which the bracket 202 flexes under a load during use. The brackets 202 may be made of metal, plastic or a combination of these or other materials. Some more flexible materials may require additional reinforcement structure 250, while other stiffer bracket 202 materials may not require reinforcement materials 250.

The securement mechanism 253, as shown in FIG. 3 through 7A, secures the mounting assembly 200 to the sidewall 154. In the example shown, the securement mechanism 253 includes a clamp member 261, a rod 255 and a fasteners 271. In the example shown by FIG. 3, there are two of each component, in other examples only one of each may be used, in others still more features may be used to secure the mounting assembly 200. This example of the securement mechanism 253 releasably couples to the flange 158 of the sidewall 154. The rod 255, best shown in FIGS. 4A and 4B, may be threaded and an upper portion 257 connects to the top portion 204 of the bracket 202, such as by threadedly engaging an aperture 206 formed in the top portion 204 of the bracket 202. In some examples the aperture 206 is formed in a slider member 280 positioned in a slot 210 formed in the top portion 204, which are part of the adjustment mechanism 275 described further below. A bottom portion 258 of the rod 255 engages a clamp member 261, such as by extending through an aperture 284 formed therein. A fastener 271 threadedly engages the bottom portion 258 of the rod 255 to cause a compressive force between the top portion 204 of the bracket 202 and the clamp member 261, which secures the mounting assembly 200 to the sidewall 154. The clamp member 261 may include a U-shaped component 265, such that the clamp member 261 is configured to receive a bottom portion of the flange 158, and a receiving block 267 that receives both the U-shaped component and the bottom portion 258 of the rod 255. In one example the fastener 271 is a wing nut. As the fastener 271 is rotated along the threaded rod 255 it contacts the bottom of the clamp member 261. Further rotating the fastener 271 exerts a force such that the clamp member 261 exerts a compressive force on the bottom of the flange 158 of the sidewall 154 through the clamp member 261 and on the top of the rim 156 of the sidewall 154 through the top portion 204 of the bracket 202. These forces removably secure the mounting assembly 200 to the vehicle 150 and reduce movement of the mounting assembly 200. In other examples, the securement mechanism 253 may couple directly to other features of the sidewall 154, such as the top rim 156. The securement mechanism 253 may also be permanent in other examples and/or use more or less components to secure the mounting assembly 200 to the sidewall 154.

Figure 4B:
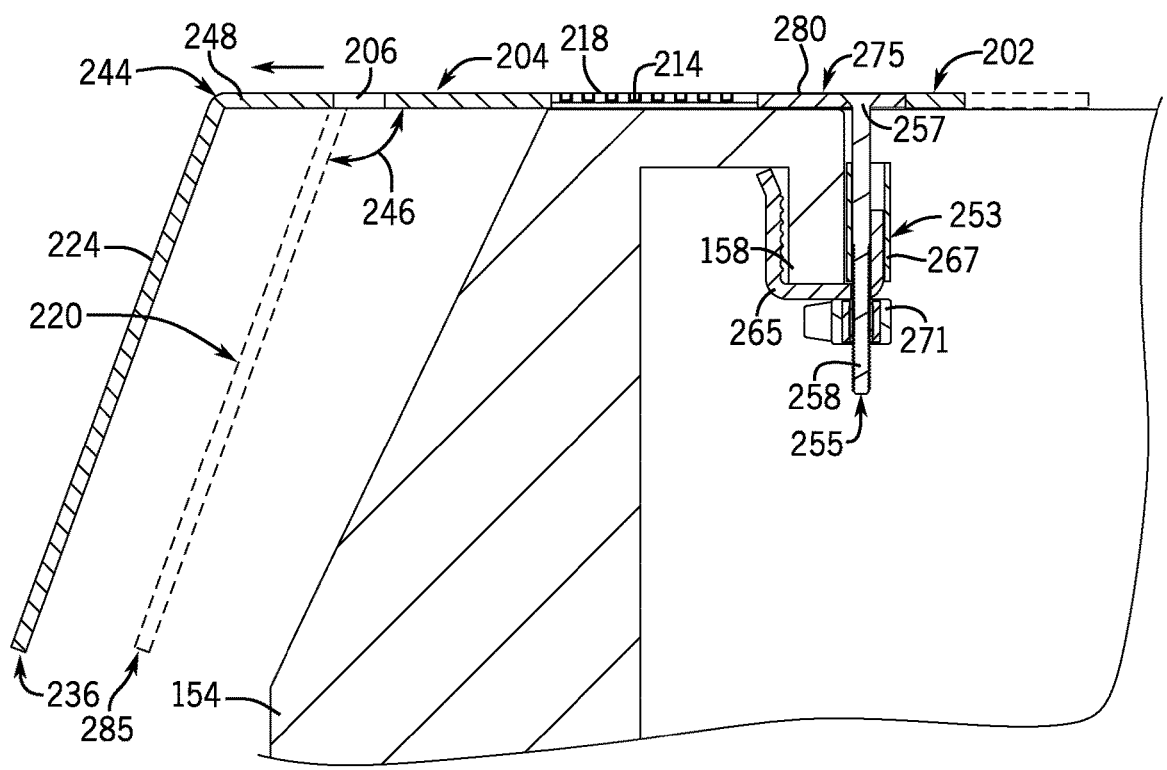
FIG. 4B shows a side elevation view of the FIG. 4A example further extended.

The adjustment mechanism 275 may allow for the bracket 202 to extend outward or inward relative to the top rim 156 of the sidewall 154, as shown by Position A—285 in FIG. 4A and position 2 in FIG. 4B. In one example, as shown by FIG. 3, the adjustment mechanism 275 includes a slider member 280 that fits within a slot 210 defined in the top portion 204 of the bracket 202. The slider member 280 rests on tracks 214 formed on opposing sidewalls within the slot 210. As noted above, the slider member 280 may define an aperture 284, the aperture 284 receiving a threaded rod 255 as part of the securement mechanism 253 described above. The slider member 280 and the corresponding components may have one of a multiple of shapes and sizes, and here are shown as generally rectangular in shape. The slider member 280 as shown by FIG. 3 is configured to fit securely in the slot 210 with little additional movement. The bottom of the slider may define one or more ridges, teeth, or other structures 282, best shown in FIG. 3, on opposing edges 212 to interface with features 282 on the opposing tracks 214 in the slot 210. For instance, the position of the slider member 280 along the length of the slot 210 may be set at discrete locations, 285 and 286, to reduce the likelihood of unintended movement of the slider within the slot 210. The engagement of the features 282 with the tracks 214 may also enhance the securement mechanism 253. When the securement mechanism 253 is loosened, the slider member 280 may be adjusted from a first position 285, such as that shown in FIG. 4A, to a second position 286 shown in FIG. 4B. In alternative examples the tracks 214 and slider member 280 may both be smooth and rely on friction to prevent movement. In additional examples, the adjust mechanism 275 may also allow for adjustment in one or more directions in addition to adjustments that position the bracket 202 more outwardly or inwardly. Other examples of the adjust mechanism allow for the bracket 202 to move relative to the sidewall 154 with reduced interference with the volume of the truck bed 152. The adjustment mechanism 275 is an optional feature of the mounting assembly 200.

Figure 5:
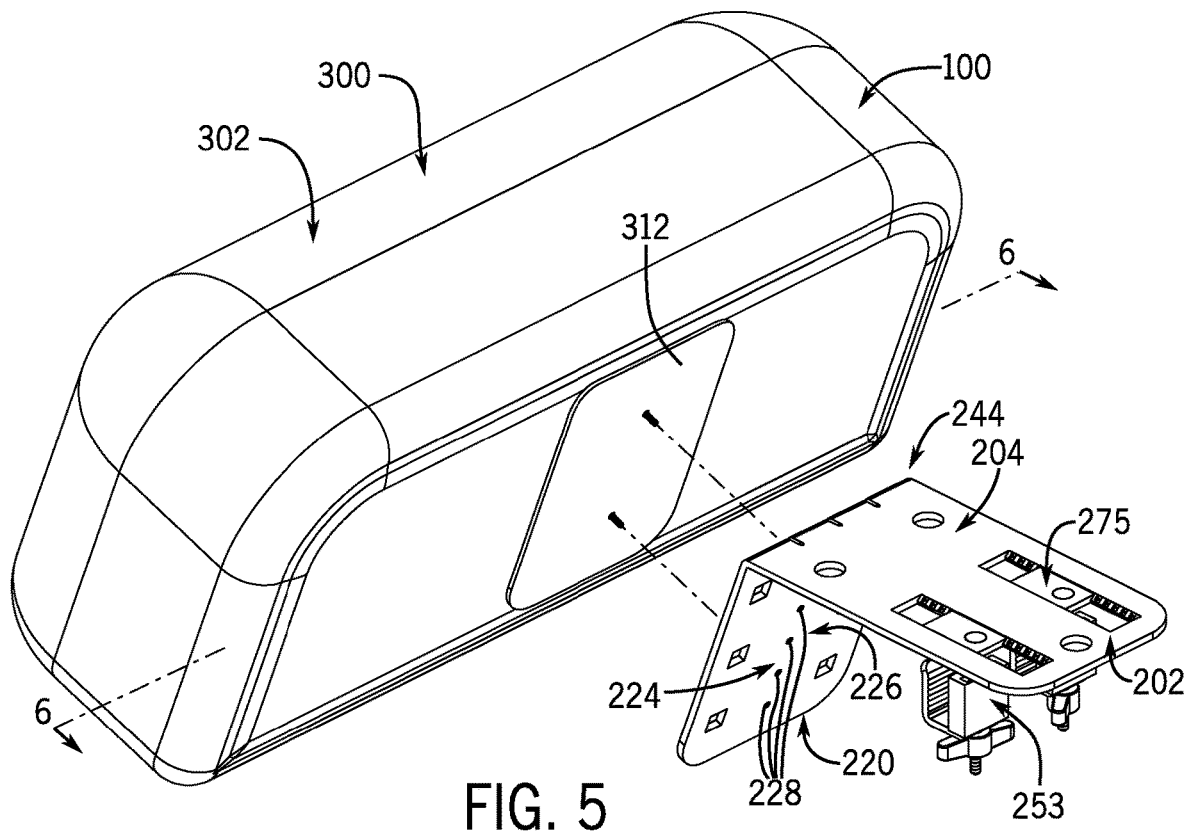
FIG. 5 shows an exploded perspective view of an example of the mounting assembly.
Figure 6:
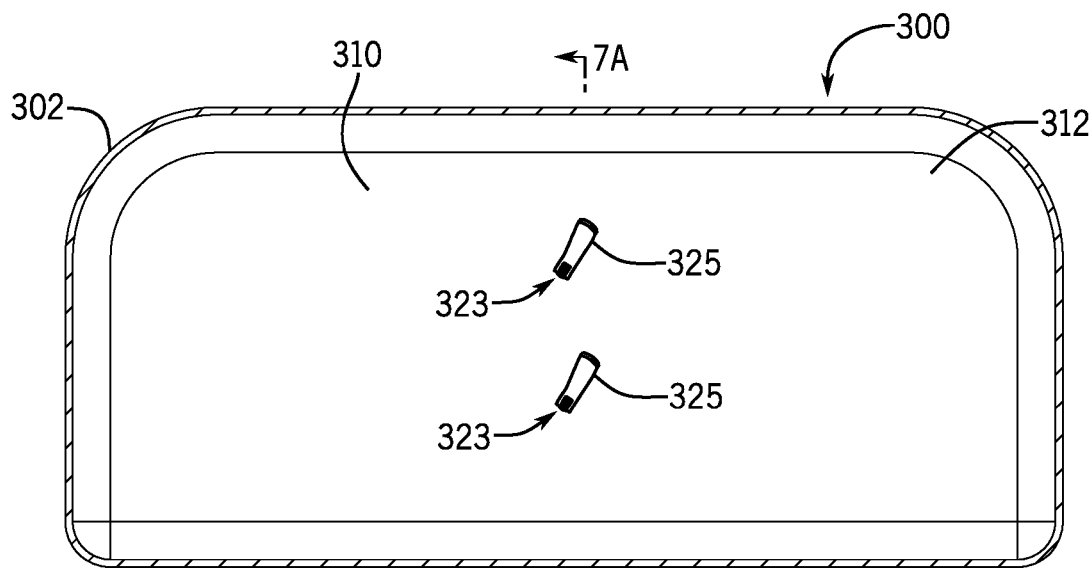
FIG. 6 shows a cross sectional view of the interior of an example of the load support structure.
Figure 7A:
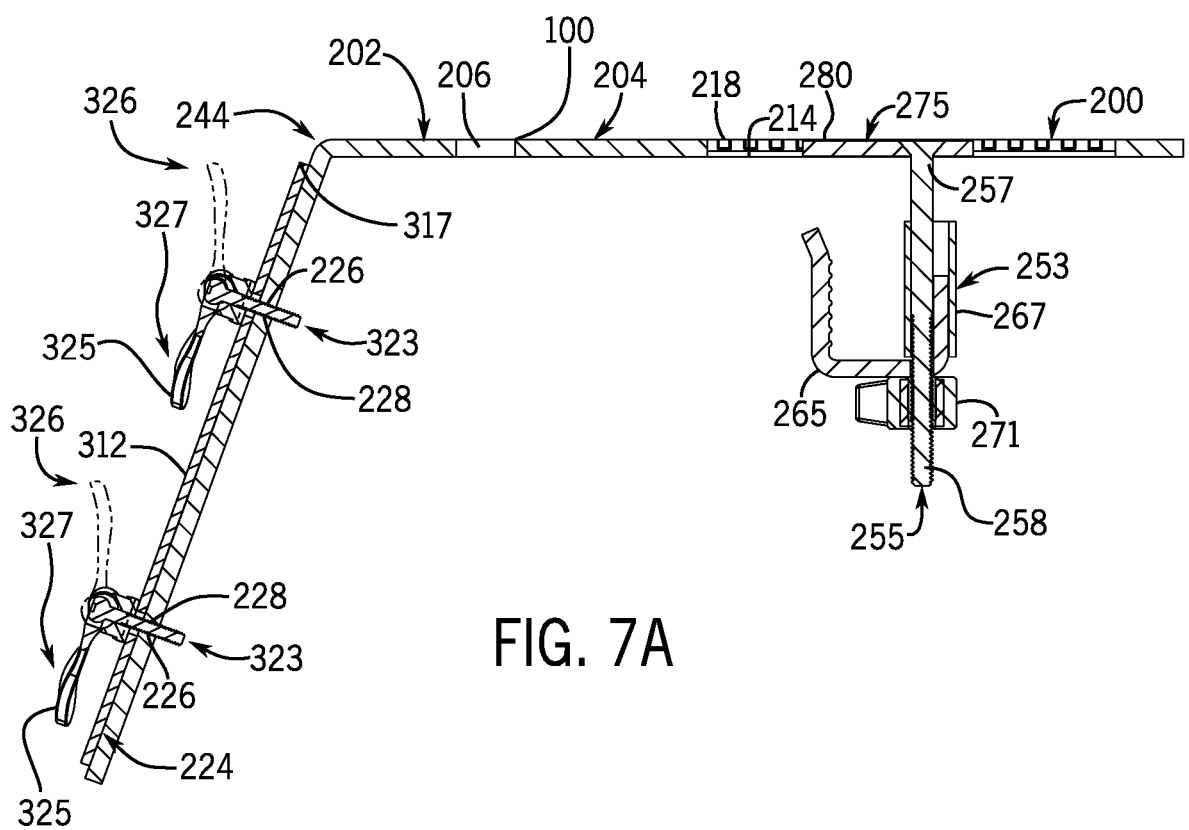
FIG. 7A shows a side cross sectional view of an example of the mounting system with the utility portion of remove for clarity.
Figure 7B:
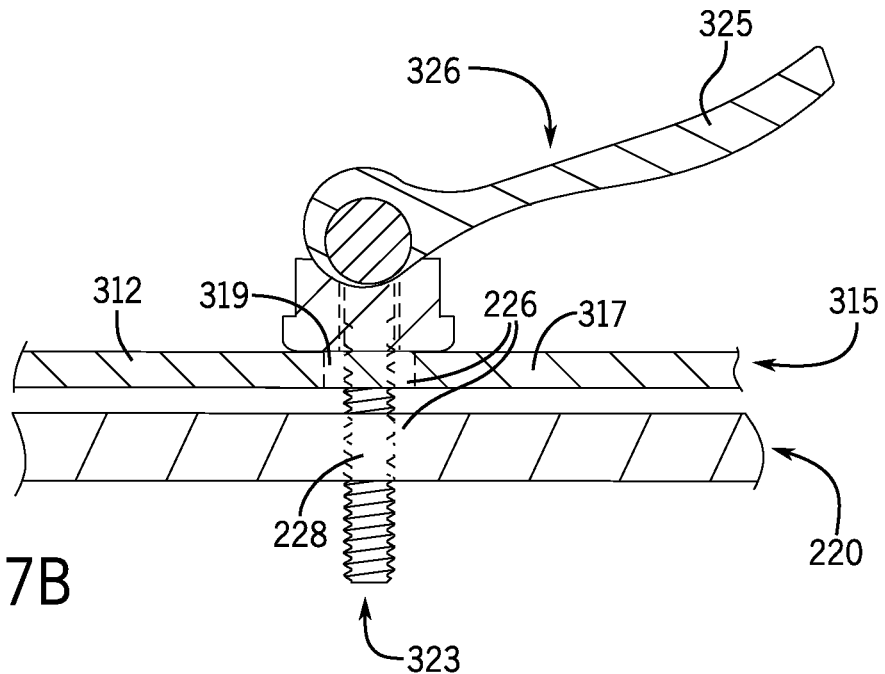
FIG. 7B shows the coupling fasteners in a loosened position.
Figure 7C:
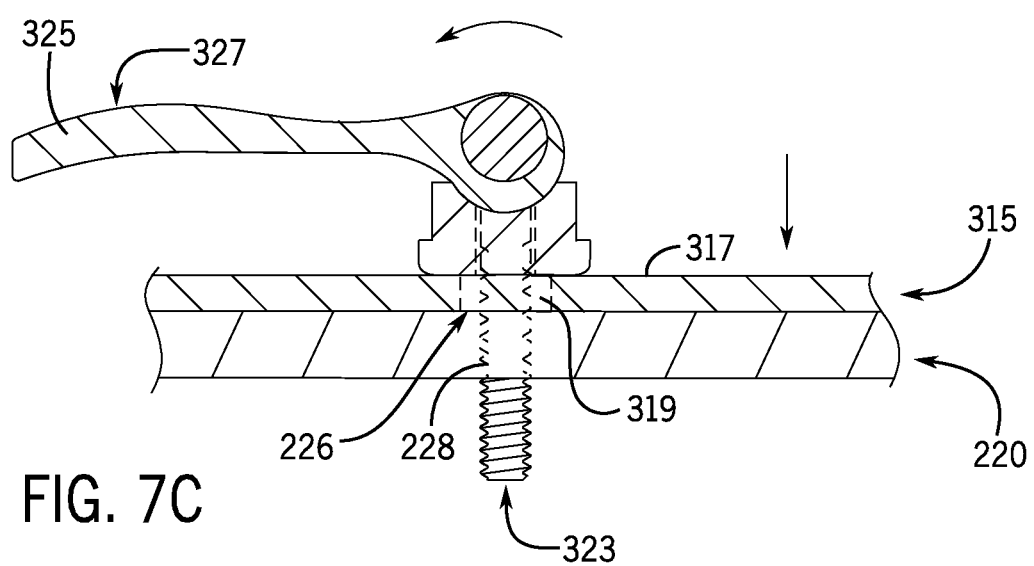
FIG. 7C shows the coupling fasteners in a closed position.

FIGS. 5-7 show an example of the load support structure 300 that releasably attaches to the mounting assembly 200 in order to allow articles to be carried outside of the truck bed 152. The load support structure 300 may include a utility portion 302 and a coupling portion 312. The utility portion 302 may be a structure that supports, encloses, or otherwise allows the mounting assembly 200 to support a load 335 on the exterior side of the truck bed 152. In the example shown in FIG. 5, the utility portion 302 is a container. The container may have a lid and a closure mechanism that allows access to an interior storage compartment 310. The interior storage compartment 310 may be used to store a variety of articles. In other examples, the utility portion 302 may be a hook 312, a platform, an eyelet 312, or a combination of structures that may be used to store or support a load. The load support structure 300 may include a coupling portion 312 that engages the receiving portion 224 of the mounting assembly 200. The engagement location 226 of the mounting assembly 200 is positioned at the same level as the rim 156, or at a level below the rim 156, of the sidewall 154, such that the coupling portion 312 engages the mounting assembly 200 at the same level as the rim 156, or at a level below the rim 156, of the sidewall 154. This position of engagement has many benefits, including at least that the user can access the bed conveniently, the utility portion 302 is positioned at a height convenient for a user to access, loads may be transported that would otherwise be too large to be contained by the volume of the vehicle bed, and the total storage and utility capacity of the vehicle 150 is increased. In general, and with respect to the examples described throughout, a location of the coupling portion 312 below the level of the rim 156 may in some cases be especially beneficial because that location may leave the rim 156, and access to the bed or the attachment of other structures to the truck, over or near the rim 156, more unobstructed or more likely unobstructed.

The coupling portion 312 in the instant example is shown in FIGS. 5-7, and includes a mounting plate 317 which is attached to the utility portion, and the mounting plate 317 defines one or more apertures 319, where each corresponds to at least one of the apertures 228 defined on the receiving portion 224 of the bracket 202 of the mounting assembly 200. The mounting plate 317 may have a substantially planar face 315. The face 315 may be suitable to receive a coupling structure. For example, a coupling fastener 323 may be received in each of the plate apertures 319. The load support structure 300 in this example is a container, such as a bag. The mounting plate 317 is attached to, or configured integrally with, a wall of the container that is intended to be positioned closest to the sidewall 154. In this example the coupling fasteners 323 may be located on the interior of the bag, see FIG. 6.

As shown in the example of FIG. 7, to attach the load support structure 300 to the mounting assembly 200, the container is positioned adjacent the mounting assembly 200, and specifically the mounting plate 317 is aligned with the receiving portion 224 of the lower portion 220 so that plate apertures 319 are aligned with the corresponding apertures 228 in the receiving portion 224 of the lower portion 220. A coupling fastener 323 is received in each aligned plate aperture 319 and aligned receiving aperture 228, and secures the mounting plate 317 to the receiving portion 224 of the lower portion 220. In this example, the coupling fastener 323 is a threaded cam locking bolt 323 which is received through the plate aperture 319, and threadedly engages with the threaded receiving aperture 319 on the lower portion 220 of the bracket 202. A suitable threaded cam locking bolt 323 may be McMaster-Carr Clamping Handle with Threaded Stud, part number 5720K25. When the threaded cam locking bolt 323 is sufficiently threadedly engaged, the lever 325 on the outer end of the cam locking bolts 323 may be actuated 326 to clamp draw the receiving portion 224 of the bracket 202 towards the outer end of the cam locking bolt 323 and clamp 327 the mounting plate 317 of the container between the outer end of the cam bolt 323 and the receiving portion 224 of the bracket 202. This secures the load support structure 300 to the mounting assembly 200. In other examples, the load support structure 300 may not have a mounting plate 317. In yet other examples, the load support structure 300 may not include a coupling structure corresponding to the mounting assembly 200 receiving portion 224. In those examples, the mounting assembly 200 may have features that interface with the load support structure 300 directly. In other examples of the mounting system 100, no separate load support structure 300 may be used, instead the mounting assembly 200 may directly support a load, as shown by FIG. 19. In these examples, the load support structure 300 may attach directly to the receiving portion 224 of the mounting assembly 200 by way of fastening members, such as straps, bungee cords, zip ties, or other such structures. For example, where the load support structure 300 is an article, such as a shovel or other item or items, the shovel may be attached to the mounting assembly 200 by fastening members.

Figure 17:
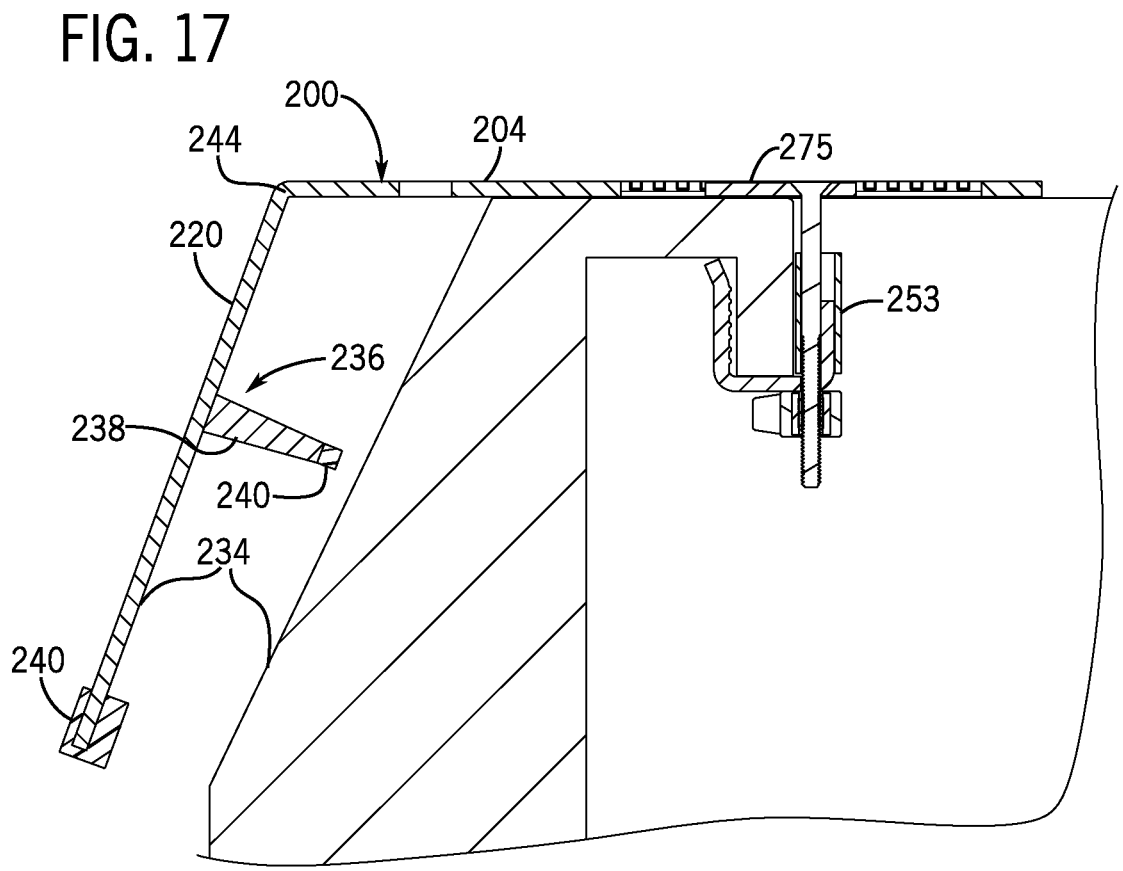
FIG. 17 shows an example of the mounting assembly with brace members.

Further, multiple mounting systems 100 may be used in conjunction to support one or more loads. The load support structure 300 may be adjusted to correspond to a spanning load 330, or the load support structure 300 itself may be designed to span between two or more receiving portions 224 or to support a spanning load 330 between two or more load support structures, as shown in FIG. 17. In one example, the mounting system 100 may include a first mounting assembly 200 towards the front of the bed and a second mounting assembly 200 towards the rear of the bed and a single load support structure 330 with at least two coupling portions 312, the coupling portions 312 corresponding to the first and second mounting assemblies, and the load support structure 300 further secured to both the first and second mounting assemblies. By using more than one mounting assembly 200 in a mounting system 100, heavier or larger loads 330 may be supported than would otherwise be possible with a single mounting assembly 200.

In other examples of the mounting system 100, the lower portion 220 of the bracket 202 may optionally include a brace member 236, as shown in FIG. 17, extending between the lower portion 220 of the bracket 202 and the sidewall 154. The brace member 236 may support the load support structure 300 against the sidewall 154 of the vehicle 150 and may also be a coating or pad 240 to reduce wear on the sidewall 154 of the truck 150. The brace member may be a discrete strut, a peg, or some other structure 238 that extends from the lower portion 220 of the bracket 202 in the inward direction and may engage, continuously or only upon deflection of the lower portion 220 of the bracket 202, the outward portion of the truck sidewall 154. The brace member 236 may extend along all or a portion of the length of the inward side of the lower portion 220, where an engagement portion of the brace feature 238 may contact the sidewall 154 of the truck 150. In such an example, the brace member 236 may be an impact resistant foam 240. Where the bracket 202 includes a brace member 236, the brace member 236 may allow for the bracket 202 to support a heavier or larger load support structure 300 than would otherwise be possible if the brace member 236 was not present. Additionally, or separately, the lower portion 220 of the bracket 202, or the brace member 236, may have a coating 240, such as a padded or resilient materials such as rubber or plastic 240. The coating 240 may be positioned on the lower portion 220 of the bracket 202, or on the brace member 236, at a location where each may contact the sidewall 154 of the truck. In some examples, the size or position of the brace member 236 may be adjusted so as to form a gap 234 between the lower portion 220 and the sidewall 154 of the truck when in the unloaded or nominally loaded position.

Figure 8:
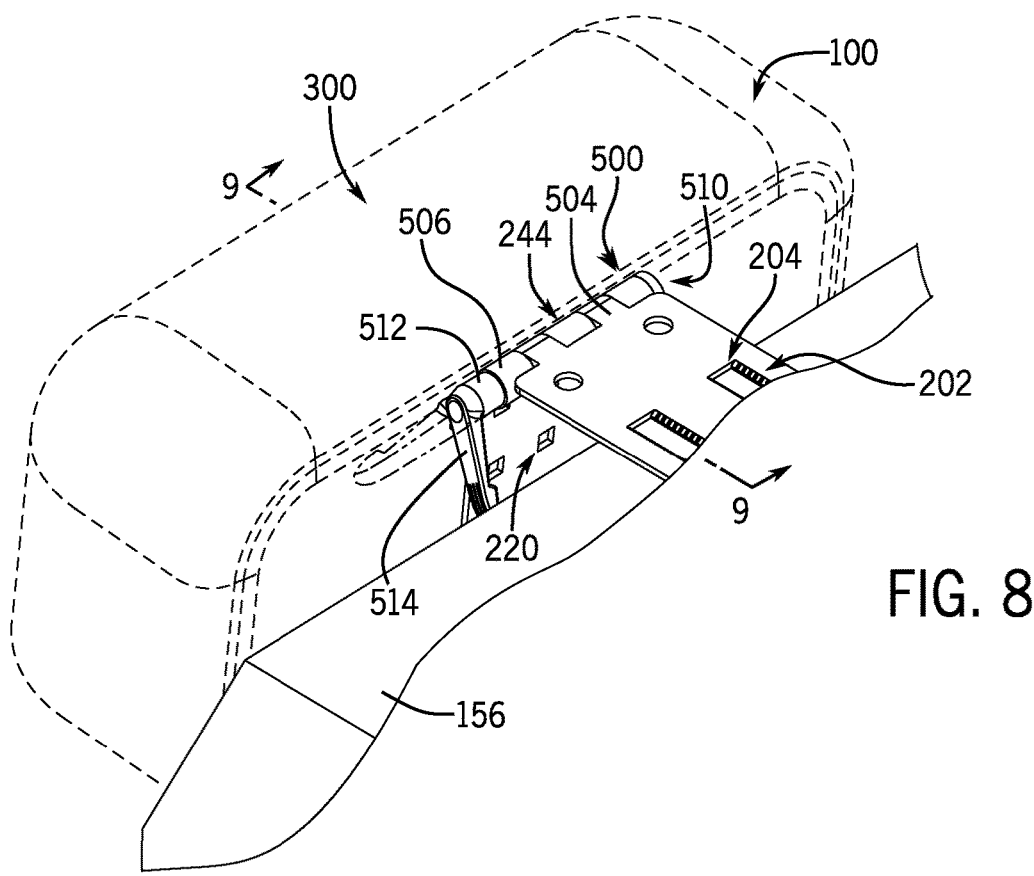
FIG. 8 shows an example of the mounting system with an adjustable joint.
Figure 9:
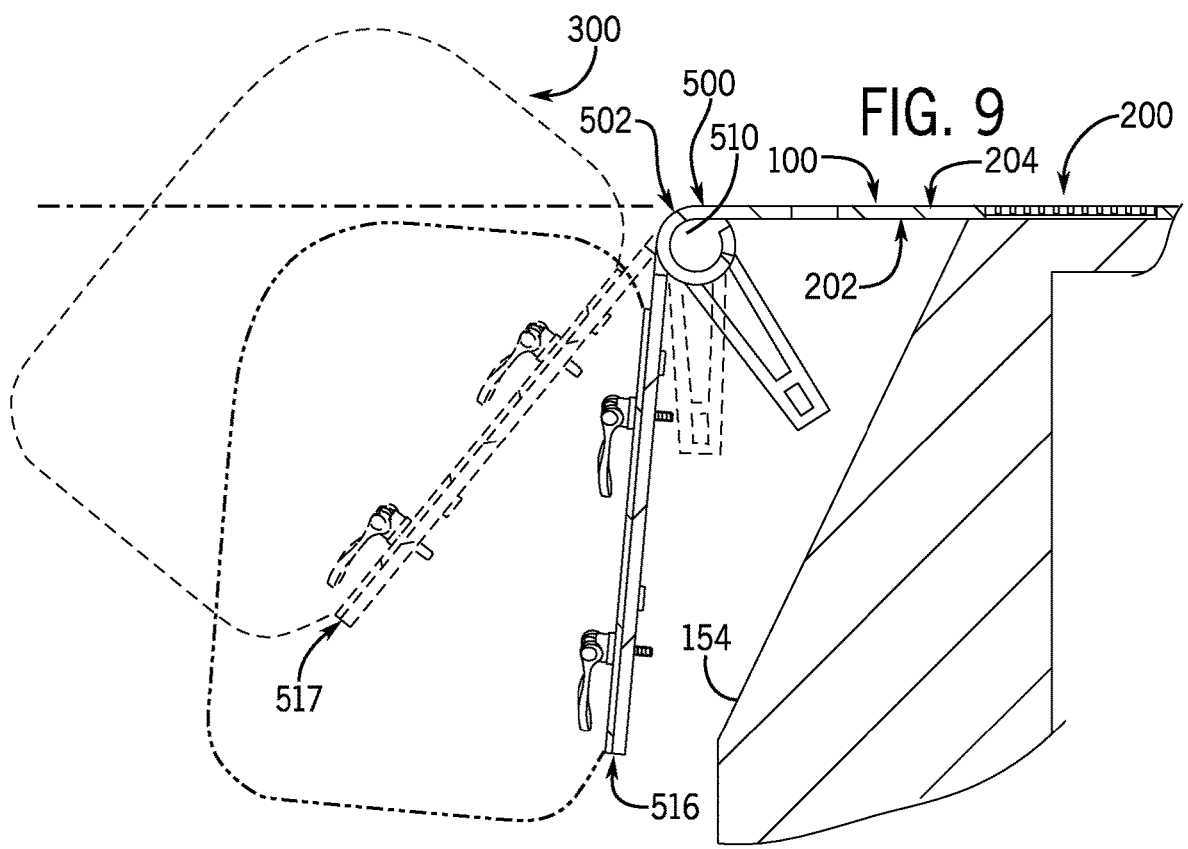
FIG. 9 shows a side cross sectional view of an example of the adjustable joint mounting system in two positions.

In some examples of the mounting system 100, as shown in FIGS. 8 and 9, the intersection portion 244 of the bracket 202 is adjustable 500 and may allow for the angle between the top portion 204 and the lower portion 220 of the bracket 202 to be adjusted. The angle Alpha (α) 246 of the bracket 202, defined as the angle between the top portion 204 of the bracket 202 and the lower portion 220 of the bracket 202, may be adjusted to many angles between contacting the sidewall 154 of the truck and a location under 180 degrees, where 180 degrees would correspond to the lower portion 220 and the top portion 204 of the bracket 202 forming a straight line. Other examples may include one or more variations of the components elsewhere described in this specification in addition to the examples currently described.

In one example, the adjustable intersection portion 500 may be a joint 502, such as in one example a piano hinge, where the top portion 204 of the bracket 202 is configured to define one or more knuckles 504 of the hinge and the lower portion 220 of the bracket 202 is configured to define one or more knuckles 506 of the hinge, the knuckles 504 of the top portion 204 configured to alternately correspond to the knuckles 506 of the lower portion 220. The joint 502 may further includes a cam-pivot axle 510, which may include an axle 510 defining threading at one end and a cam locking lever 514 at the opposing end, and a collar 512 configured to slide over the axle 510 to be placed on the locking lever 514 side of the axle 510. When the adjustable intersection portion 500 is assembled, the knuckles of the top 504 and lower 506 portion 220 interlineate to allow the axle 510 of the cam-pivot mechanism 500 to pass through the knuckles, 504 and 506. The end knuckle 504 and 506, may be threaded to threadedly receive the threaded end of the axle 510, or there may be an additional fastener, such as a nut, configured to thread over an exposed portion of the axle 510 that may extend outward from the end knuckle, 504 and 506. The adjustable intersection 500 may be positioned from an original location 516 and set at desired angle 517 Alpha (α) 246, and then secured at that angle 517 by actuating the cam locking lever 514. When the cam lock lever 514 is engaged, the knuckles, 504 and 506, of the joint 502 are compressed together such that movement of the lower portion 220 of the bracket 202 relative to the top portion 204 of the bracket 202 is inhibited.

Other examples of the adjustable intersection portion 500 may allow for pre-configured bottom or top portion 204s to be replaced to change the angle Alpha (α) 246 or the general configuration of the intersection portion 500.

In another example of the mounting assembly 200, as shown in FIGS. 11 to 14, the mounting assembly 1000 may include a bracket housing 1200 including a securement mechanism 253 and an adjustment mechanism 1300. In this example the engagement location 1400 of the load support mechanism, as with the other example above, is at or below the level of the truck bed rim 156. Further, the coupling mechanism may be the same as an earlier example, or, additional or different components may be further included. This example may include a brace member 236 as previously described in this specification, and the components of the bracket 1100 assembly may further include a coating as previously described. In this example, the mounting assembly 1000 is a receiving housing assembly 1000 and includes a multi-layered bracket housing 1200 and a bracket 1100 having a top portion 1102 and a lower portion 1106, similar to the bracket 1100 described with respect to FIGS. 1-7. The configuration of this example of the mounting assembly 1000 allows for the bracket 1100 to extend and retract inward and outward relative to the rim 156 of the sidewall 154 without a portion of the bracket 1100 extending into the volume of the truck bed 152. The reduced interference with the volume of the truck bed 152 allows for objects that fit into the truck bed 152 and are adjacent to the inside edge of the sidewall 154, such as truck bed campers, utility boxes, and other payloads, to be used in conjunction with the mounting system 100. Other examples may include one or more variations of the components elsewhere described in this specification in addition to the examples currently described.

The bracket housing 1200 includes a top plate 1202, a bottom plate 1220, and an elongated recess 1250 defined between the top plate 1202 and the bottom plate 1220. In this example, the bottom plate 1220 is planar, and the top plate 1202 has one or more opposing edge portions 1204 that generally align with one or more opposing edges 1224 of the bottom plate 1220. One or more central portions 1210 of the top plate 1202, between the opposing edge portions 1204, is displaced upwardly from the plane of the opposing edges 1224. A gap 234 between a central portion 1210 of the top plate 1202 and a central portion 1225 of the bottom plate 1220 forms an elongated recess 1250. The elongated recess 1250 is configured to receive the top portion 1102 of the bracket 1100.

Figure 12:
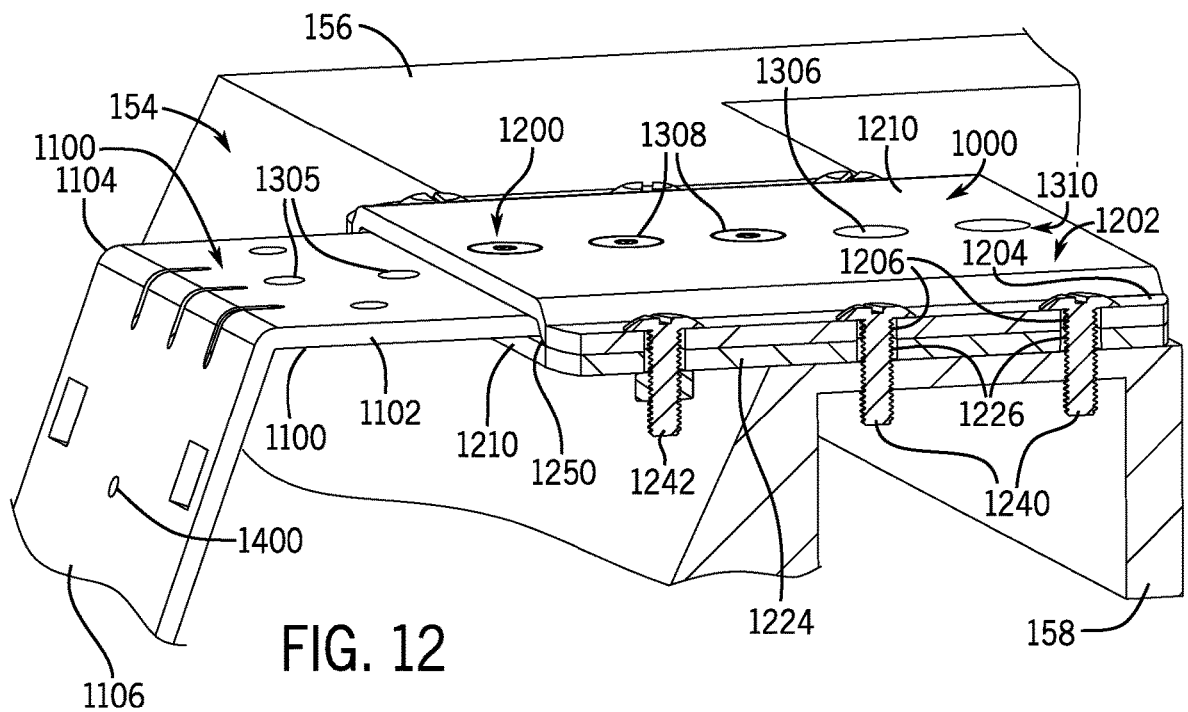
FIG. 12 shows a perspective cross sectional view of an example of the mounting assembly.

This example of the mounting assembly 1000 is coupled directly to the top rim 156 of the sidewall 154. The bracket housing 1200 may be permanently or removably coupled. As shown by FIG. 12, the aligned outer edges of the top plate 1202 and the bottom plate 1220 define securement portions 1204, each of which include one or more securement apertures 1206 and 1226. One or more of the securement apertures 1206 and 1226 may correspond to openings on the top of the rim 156 of the sidewall 154. A securement fastener 1240, such as a threaded fastener, may be inserted into the corresponding securement apertures 1206 and 1226 and openings in the rim 156 of the sidewall 154 and couple the mounting assembly 1000 to the rim 156 of the sidewall 154.

The securement apertures 1206 and 1226 and the openings may be threaded or an additional fastener, such as a nut, may receive the securement fastener 1240 to attach the mounting assembly 1000 to the rim 156 of the sidewall 154.

The adjustment mechanism 1300 may secure the top portion 1102 of the bracket 1100 inside the elongated recess 1250, and allow for adjustment of the amount the top portion 1102 is received within the recess. The positioning of the top portion 1102 of the bracket 1100 within the recess defines the extension of the bracket 1100 relative to the sidewall 154 of the truck bed.

Figure 13:
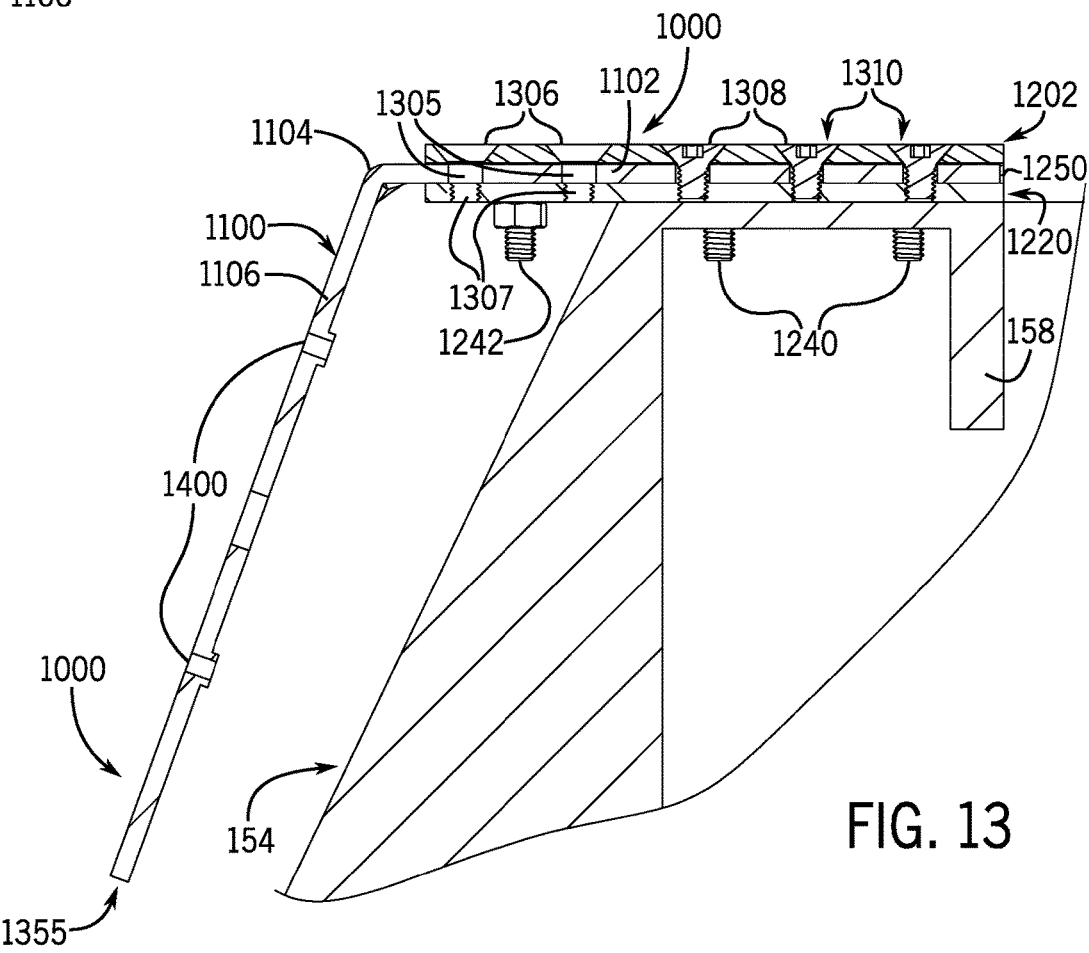
FIG. 13 shows a cross sectional view of an example of the mounting assembly.
Figure 14:
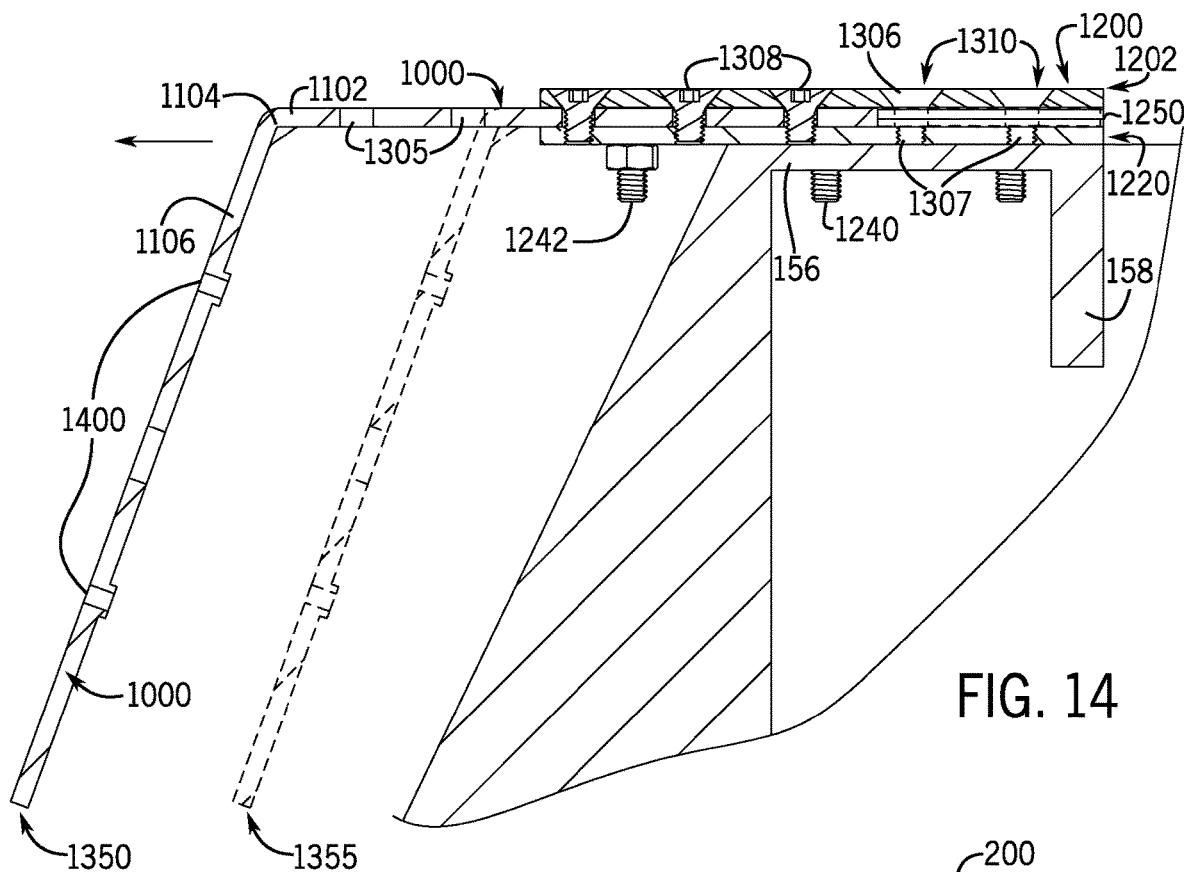
FIG. 14 shows an example of the mounting assembly in a further extended view.

In this example, the bracket 1100 portion is similar to previously described examples of the bracket 202, and includes a top portion 1102, lower portion 1106, and an intersection portion 1104. The top portion 1102 may also define one or more adjacent apertures. In the example shown in FIGS. 11 to 14, the top portion 1102 defines one or more adjustment apertures 1305. One or more apertures, 1306 and 1307, are formed in the top and bottom plate 1220s, and correspond to the location of the adjustment apertures 1305 in the top portion 1102 of the bracket 1100. In this example, the adjustment apertures, 1305, 1306, and 1307, are aligned linearly 1310 with regular spacing there between. Many other aperture patterns 1310 would suffice so long as the pattern 1310 allows for the bracket 1100 to be repositioned inwardly 1355 and outwardly 1350 relative to the rim 156 of the sidewall 154, and be secured by corresponding aligned apertures 1306 and 1307 in the top 1202 and bottom plates 1220. The adjustment apertures 1305 in the top portion 1102 of the bracket 1100 may be threaded or define un-threaded holes As shown by FIGS. 13 and 14, the adjustment apertures 1307 on the bottom plate 1220, most visible in FIGS. 13 and 14, may be threaded while the apertures 1306 on the top plate 1202 may be countersunk and threaded or unthreaded. In the configuration described, a threaded adjustment fastener 1308 may be inserted into the corresponding adjustment apertures, 1305, 1306, and 1307, to hold the bracket 1100 in a set location relative to the bracket housing 1200 and the sidewall 154. The mounting assembly 1000 of this example maintains a low profile designed to reduce interference with items engaging the top rim 156 of the sidewall 154.

Figure 11:
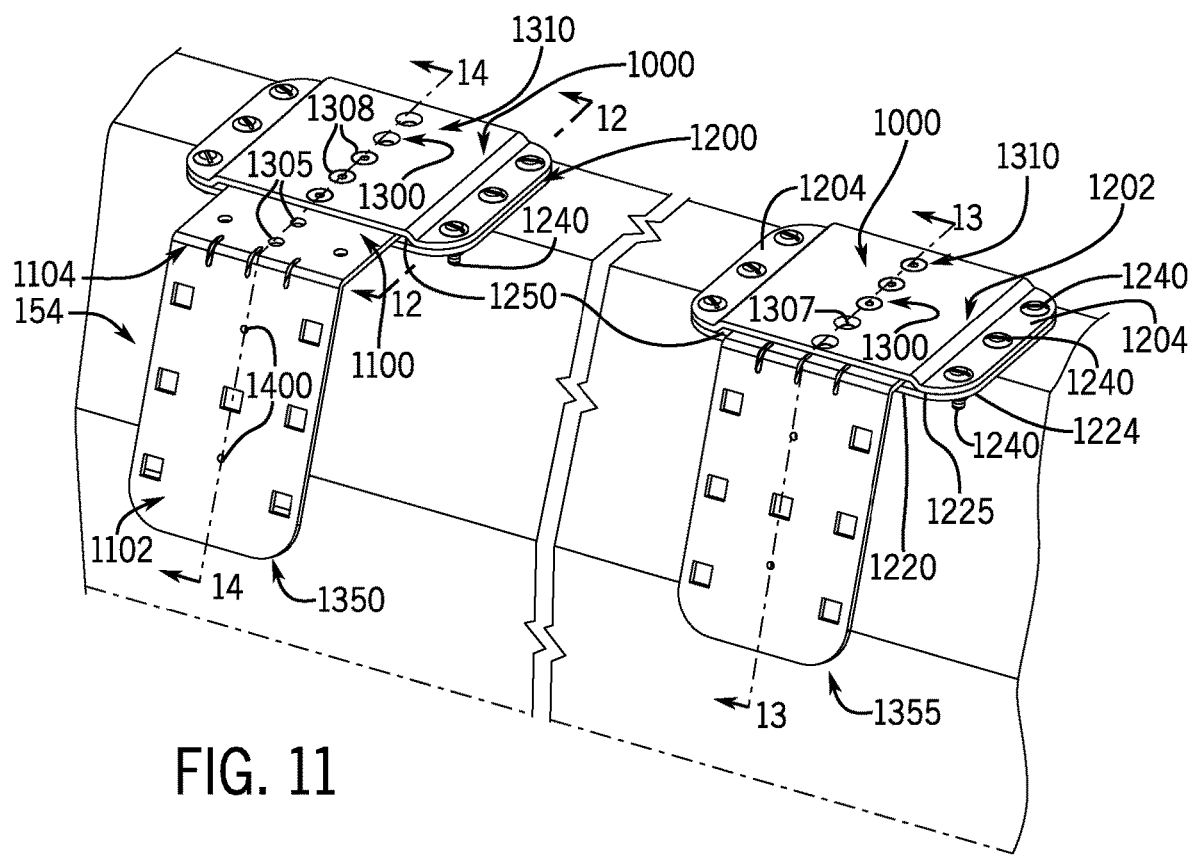
FIG. 11 shows an example of the mounting assembly in two positions.

The apertures 1306 and 1307 of the multi-layered housing may be configured to allow for the bracket 1100 to be adjusted into positions further inward 1355 or outward 1350 relative to the sidewall 154, as shown by FIG. 11. Adjustment of the bracket 1100 may be accomplished by moving the bracket 1100 further into or extend from the recess, aligning at least one adjustment aperture 1305 in the bracket 1100 with at least one corresponding aperture 1306 in the top plate 1202, and securing the bracket 1100 in place with at least one adjustment fasteners 1308. In one example, the adjustment fastener 1308 may extend only into the top portion 1102 of the bracket 1100. In other examples, the adjustment fastener 1308 may extend through the top plate 1202 and into the bottom plate 1220, through the top portion 1102 of the bracket 1100. When the mounting assembly 1000 is in the fully retracted corresponding position, shown by FIG. 13, the top portion 1102 of the bracket 1100 may not extend into the interior volume of the truck bed 152 and interfere with use of the truck bed 152.

Figure 10:
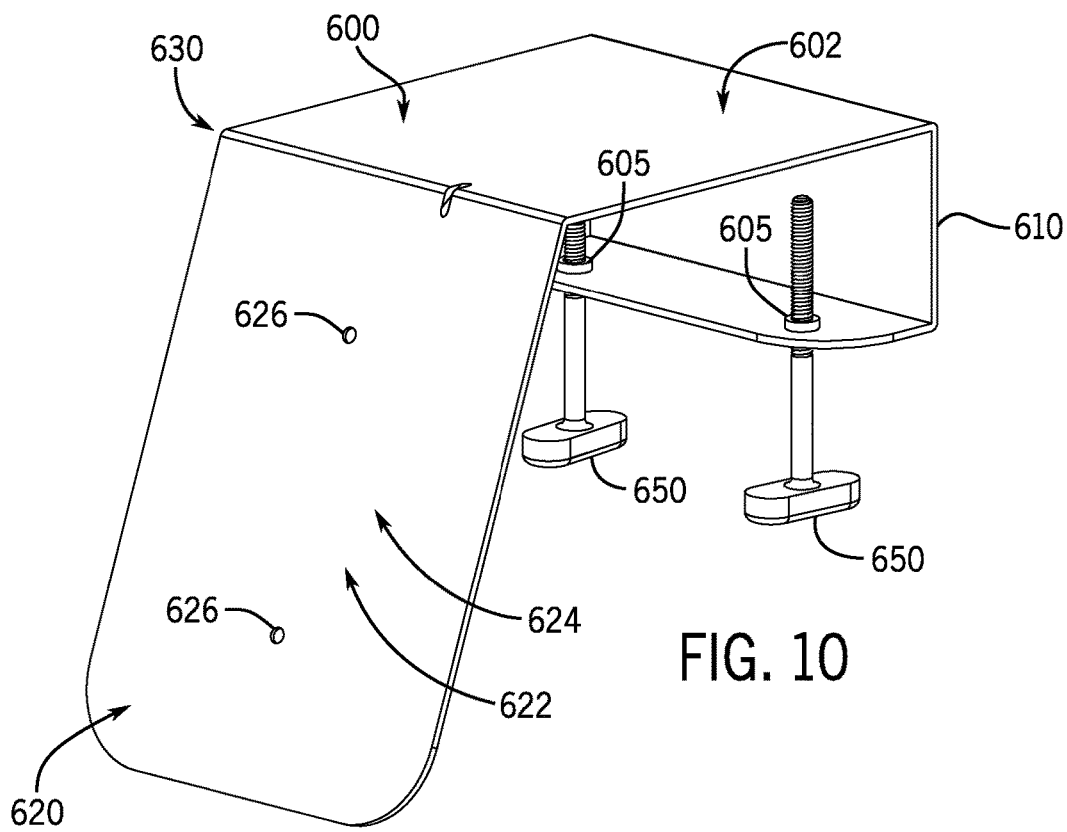
FIG. 10 shows an example of the mounting assembly with no adjustment mechanism.

In the example shown in FIG. 10, the mounting assembly 200 includes a bracket 600 and one or more fasteners 650. In this example the bracket 600 includes a top portion 602, a lower portion 620, an intersection portion 630, and may include a securement portion 610. In this example the bracket 600 is attached directly to the sidewall 154 by fasteners 650. The distance of the lower portion 620 of the bracket 600 to the sidewall 154 may not be adjustable. The angle of the lower portion 620 of the bracket 600 may or may not be adjustable relative to the top portion 602 similar to the example in FIGS. 8 and 9. Other examples may include one or more variations of the components elsewhere described in this specification in addition to the examples currently described.

The top portion 602 of the bracket 600 rests on the rim 156 of the sidewall 154 and may define apertures 605. The lower portion 620 may be similar to previous examples 220 and may include a receiving portion 622, the receiving portion 622 defining an engagement location 624 between a load 335 or a load support structure 300. The engagement location 624 is at or below the rim 156 of the sidewall 154. The receiving portion 622 may define one or more apertures 626. The intersection portion 630 may also be similar to previous examples, defining the location where the top portion 602 and the lower portion 620 intersect, as well as the angle Alpha ($\alpha$) 246 between the top portion 602 and the lower portion 620. A gap 234 may be defined by the area between the sidewall 154 and the lower portion 620 of the bracket 600. The intersection may be continuous or may be defined as the location where one or more separate portions defining the top and lower portions 620 interface. The securement portion 610 may be a portion that extends from or interfaces with the top portion 602 of the bracket 600 extending downward relative to the rim 156 of the truck bed along the flange 158 of the sidewall 154, with a portion 610 extending outward under the flange 158. One or more securement apertures 605 may be defined by the securement portion 610 such that a fastener may be inserted to secure the bracket 600 to the flange 158.

This example of the mounting assembly 200 includes a reduced vertical profile and a reduced horizontal profile, allowing objects such as truck covers or truck bed campers to be placed on the rim 156 and over the top of the mounting system 100, and sealed, as well as against the mounting system 100 in the truck bed 152 with reduced interference. In other examples, there may be no securement portion 610 and the securement mechanism 253 may be defined by securement fasteners 650 inserted into apertures 605 on the top portion 602 to secure the top portion 602 of the bracket 600 to the rim 156 of the truck bed. In this example, there would be little or no interference with the volume of the truck bed 152 while the reduced vertical profile would allow for objects to still be placed over the top of the mounting system 100 and on the rim 156 of the sidewall 154.

Figure 15:
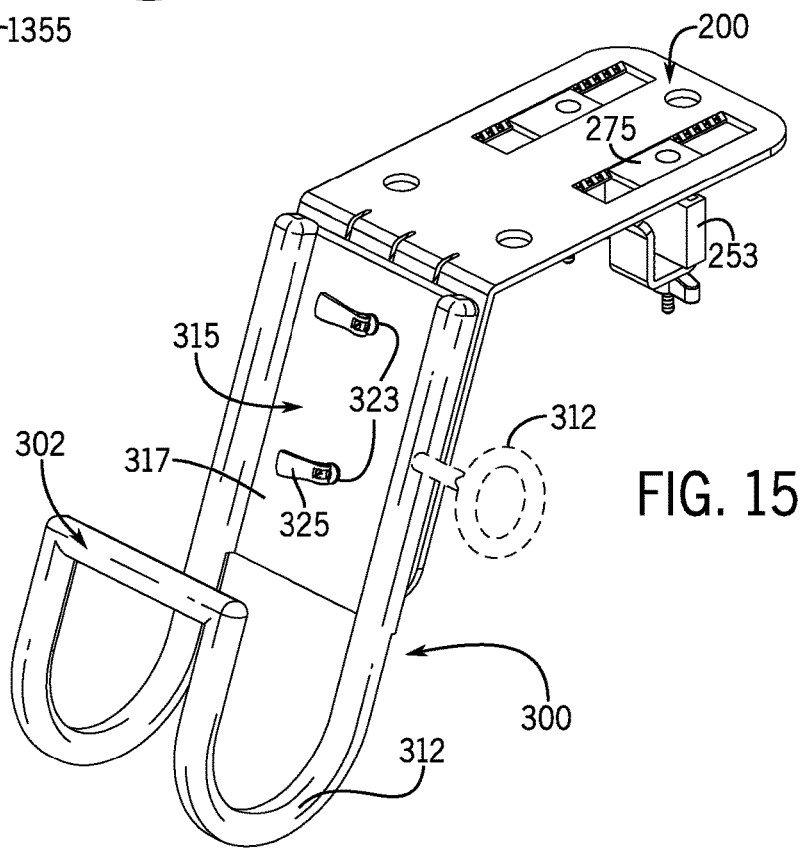
FIG. 15 shows an example of the load support structure.

In other examples of the load support structure 300, the utility portion 302 may contain one or more useful features, such as a hook 312, or an eyelet 312 as shown in FIG. 15. The load support structure 300 may be configured to allow for multiple utility portions to be connected to the same coupling portion 312.

Figure 16:
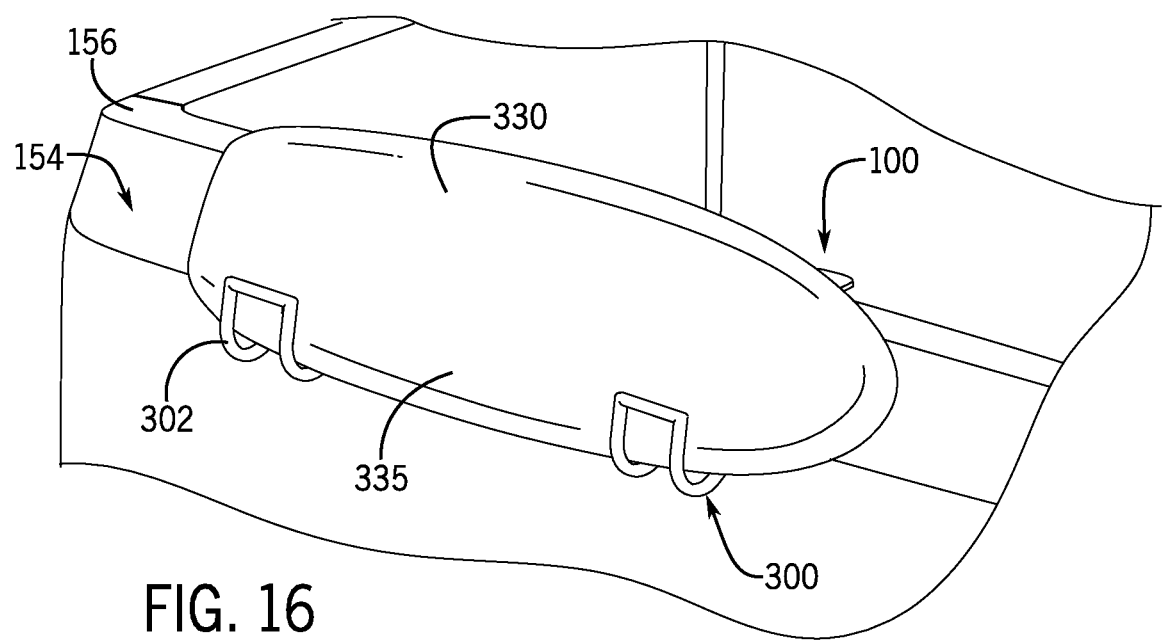
FIG. 16 shows an example of a spanning load support structure.

Regarding each of the examples described herein, while the engagement location 226 between the coupling portion 312 of the load support structure and the receiving portion 224 of the mounting assembly 200 is at or below the rim 156 of the sidewall 154, the load carried by a load support structure 300 may extend above the rim 156 of the sidewall 154, as shown by FIG. 16.

Other examples of a mounting assembly 2000, 2100, and 2200 are shown for example in FIGS. 20A-20G, 21, 22A, and 22B, respectively. The mounting assembly 2000, 2100, 2200 may be similar to other mounting assemblies disclosed herein and have similar benefits. These benefits include conveniently positioning cargo and accessories 2008 outboard of a vehicle 150 body, and alternatively or additionally, outside of a cover component mounted on a vehicle body, such as for example a topper structure (see FIG. 1B and FIG. 20C).

Figure 20A:
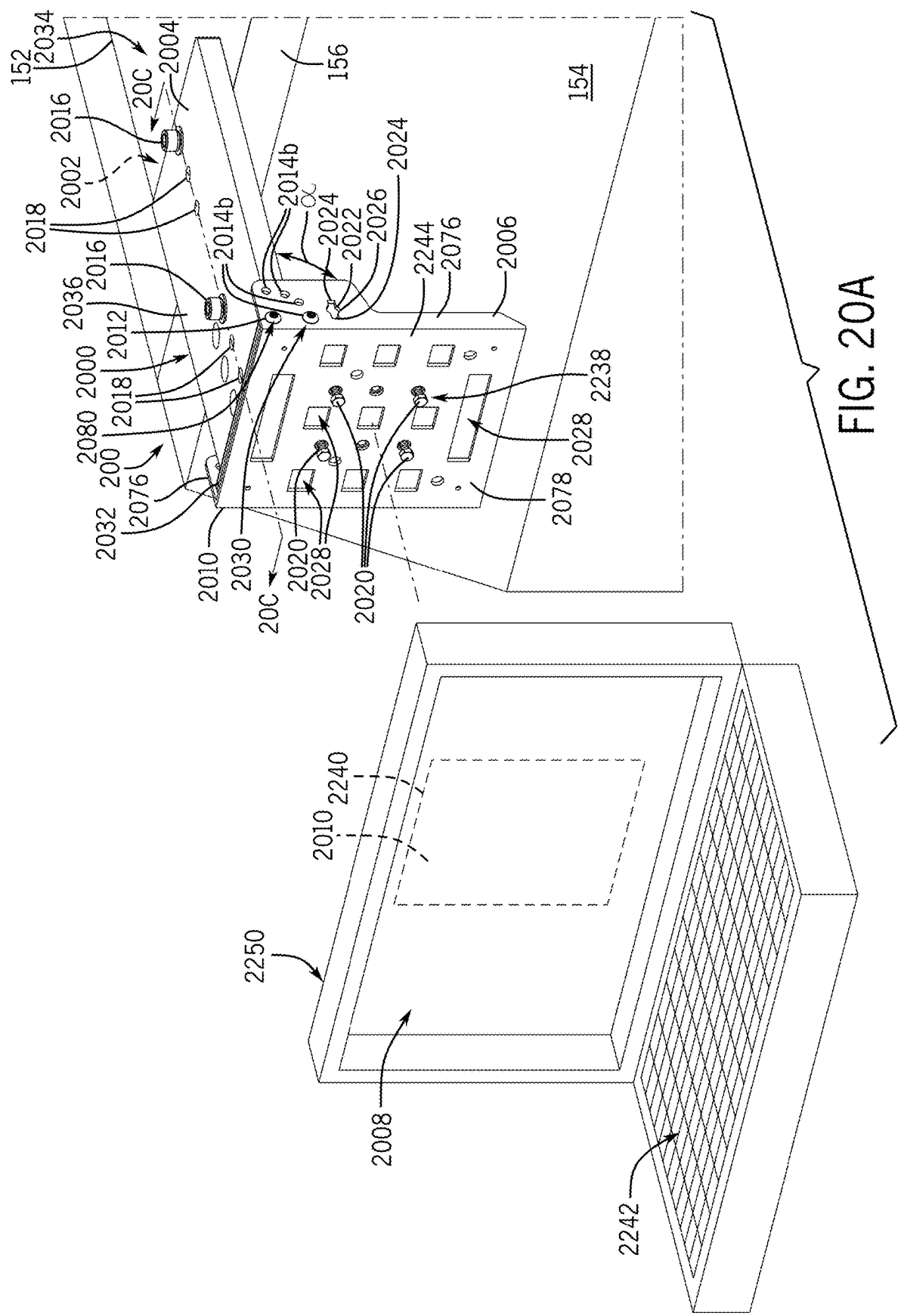
FIG. 20A shows an example of a mounting assembly.
Figure 21:
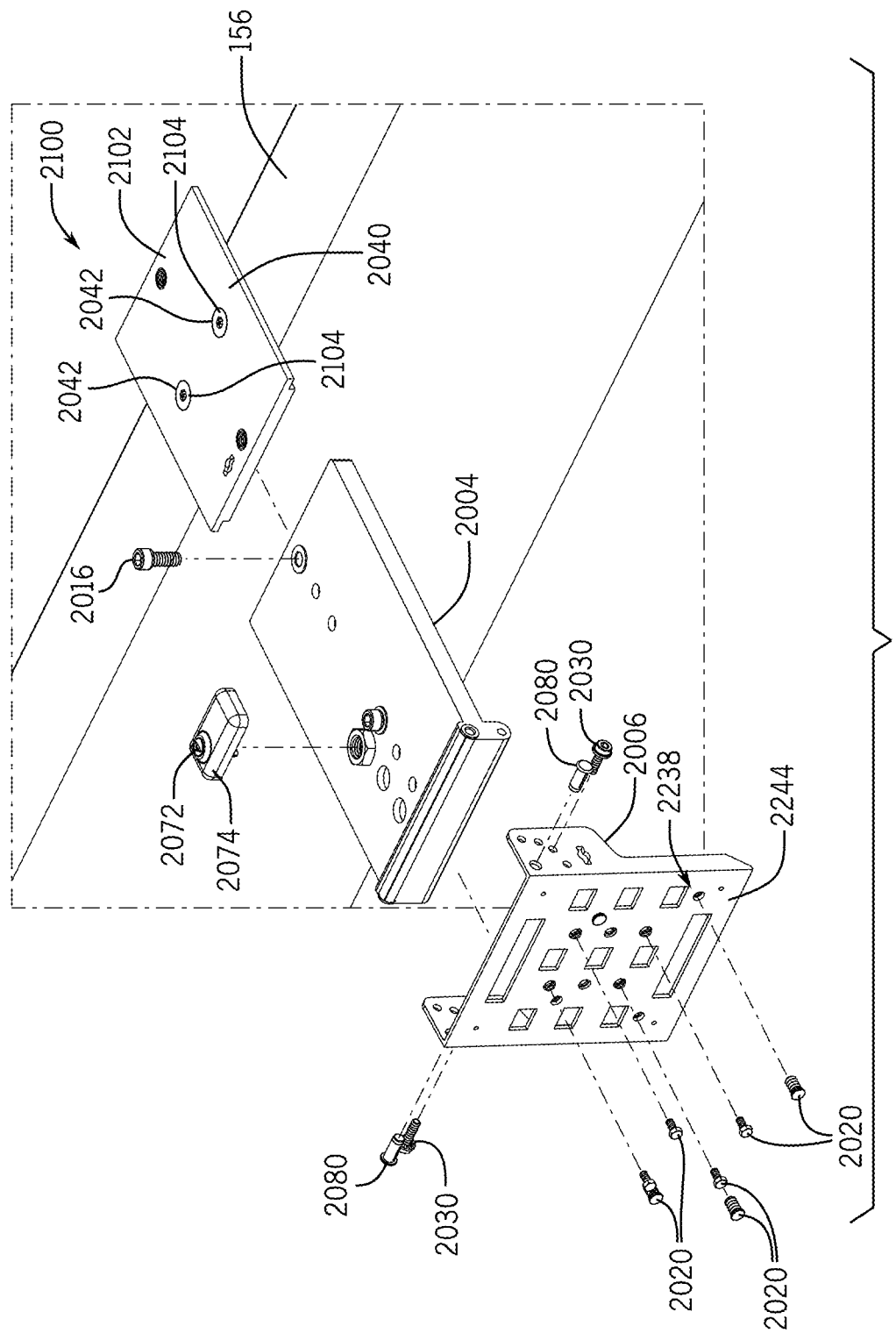
FIG. 21 shows an example of a mounting assembly.
Figure 22A:
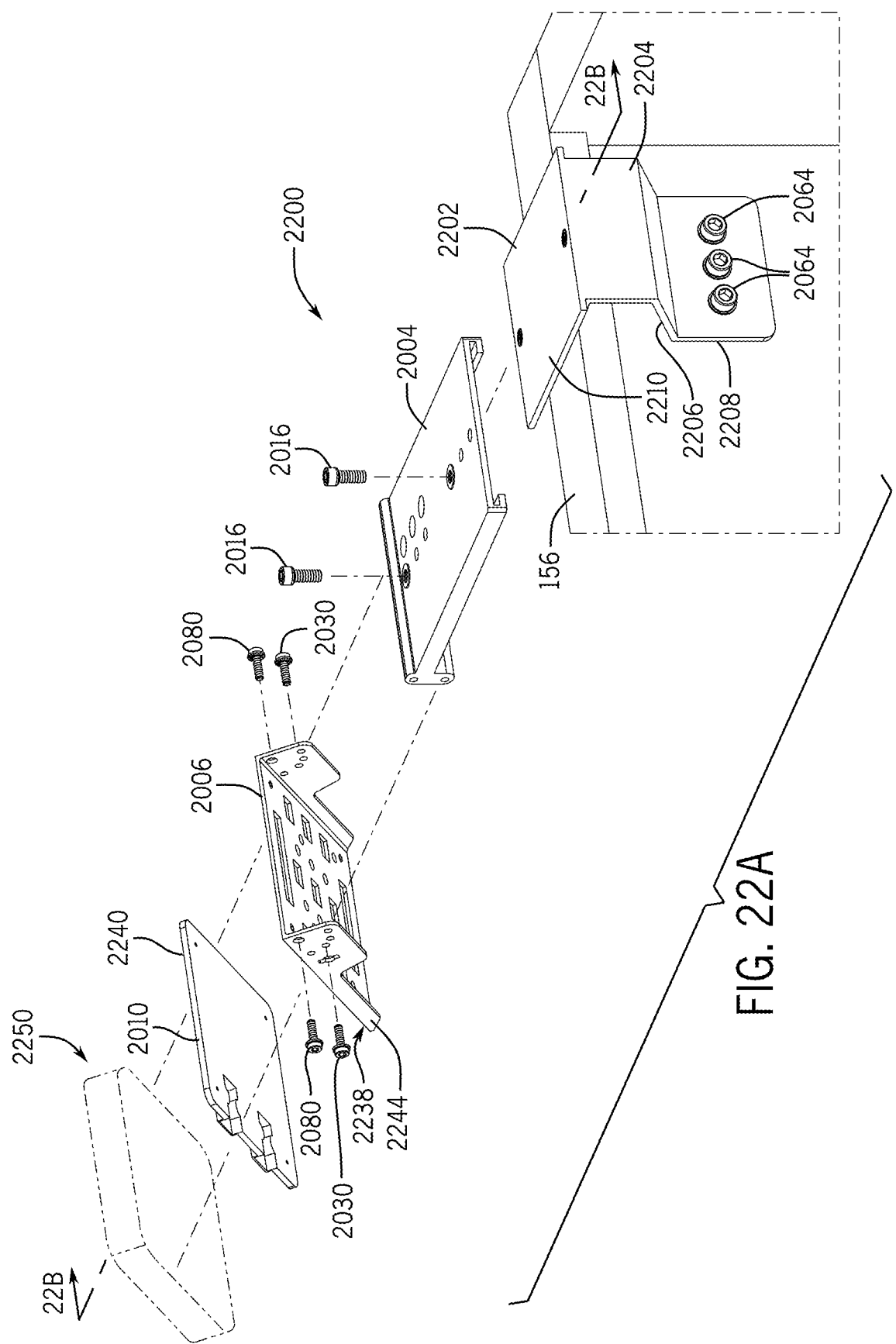
FIG. 22A shows an exploded view of an example of a mounting assembly.
Figure 22B:
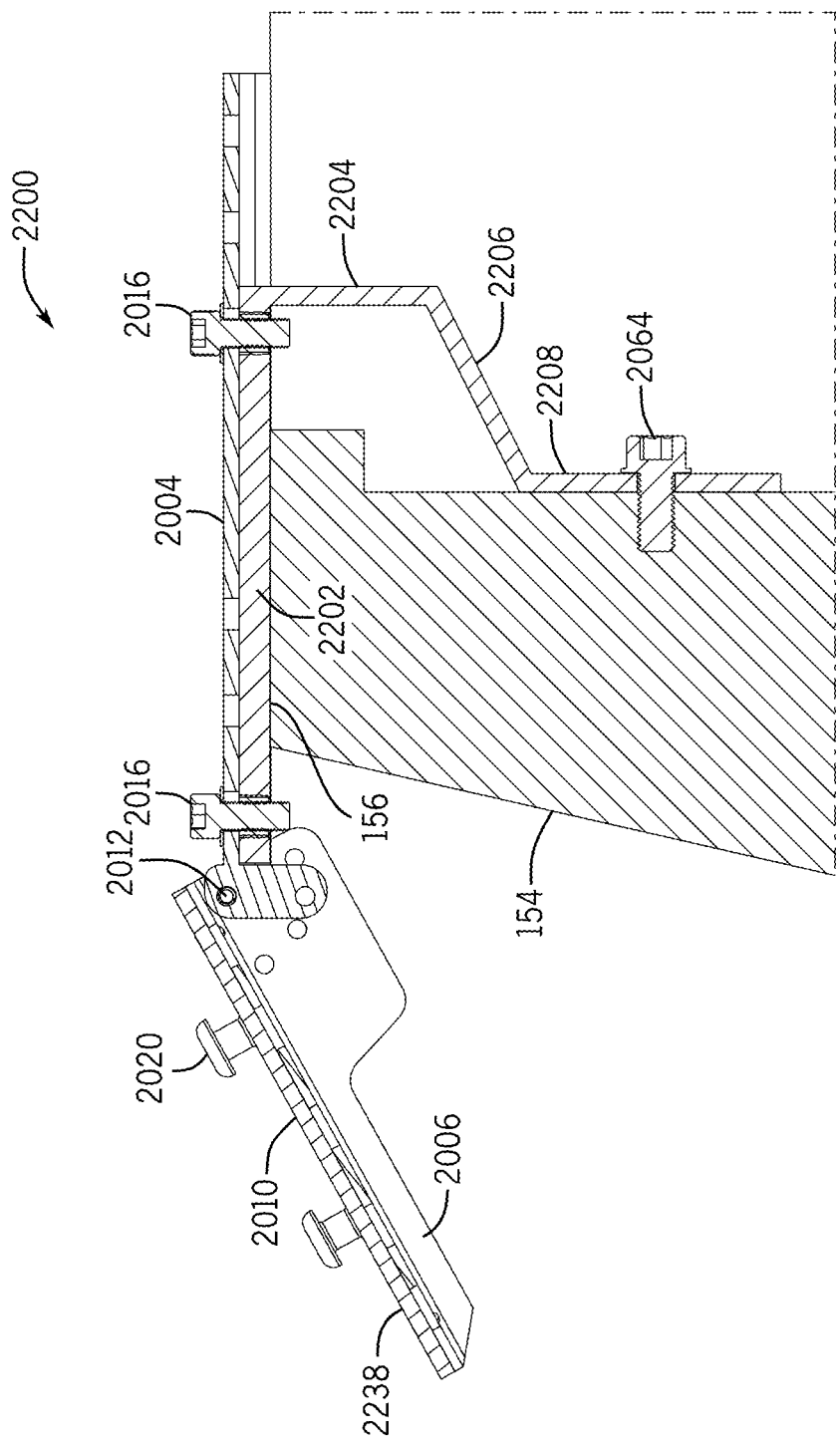
FIG. 22B shows a section view of the mounting assembly of FIG. 22A.

As shown for example in FIG. 20A, and as may apply also to FIGS. 21, 22A and 22B, the mounting assembly 2000 may be mounted to a rim 156 of a sidewall 154 of a truck bed 152. The mounting assembly 2000 allows the attachment of a load support structure 2242 (for example, a container as shown) to the outside of a vehicle for easy access. The coupling portion 2240 of the load support structure 2242 may be releasably attached with the receiving portion 2244 of the mounting assembly 2200. Because the receiving portion 2244 defines the engagement location 2238 of the mounting assembly 2000, and the receiving portion 2244 is in one example below the rim 156, or in another example is at the level of the rim or below the rim 156, the engagement location 2238 is at or below the rim 156 of the sidewall 154 consistent with the other examples of the mounting assembly described herein. The cargo attached to the load support structure 2242 may be easily accessible from outside the truck bed.

Continuing with FIG. 20A, and as may also apply to FIGS. 21, 22A and 22B, the load support structure 2242 may include a utility portion 2250 and a coupling portion 2240. The utility portion 2250 may be a structure that supports, encloses, or otherwise allows the mounting assembly 200 to support a load 335 on the exterior side of the truck bed 152. In the example shown in FIG. 20A, the utility portion 2250 is a container. The container may have a lid and a closure mechanism that allows access to an interior storage compartment. The interior storage compartment may be used to store a variety of articles. In other examples, the utility portion 2250 may be a hook (see FIGS. 15, 19), a platform, an eyelet (see FIG. 15), or a combination of structures that may be used to store or support a load. The load support structure 2242 may include a coupling portion 2240 that engages the receiving portion 2244 of the mounting assembly 2000. The engagement location 2238 of the mounting assembly 2000 is positioned at the same level as the rim 156, or at a level below the rim 156, of the sidewall 154, such that the coupling portion 2240 may engage the mounting assembly 2000, 2100, 2200 at least partially at the same level as the rim 156, or at a level below the rim 156, of the sidewall 154. The coupling portion 2240 may be integrated with the load support structure 2242, or may be separate from the load support structure 2242 and removably attached there to. The coupling portion may be secured to the receiving portion 2244 by fasteners 2020 positioned through apertures 2021, or by other capable attachment mechanisms.

Figure 20B:
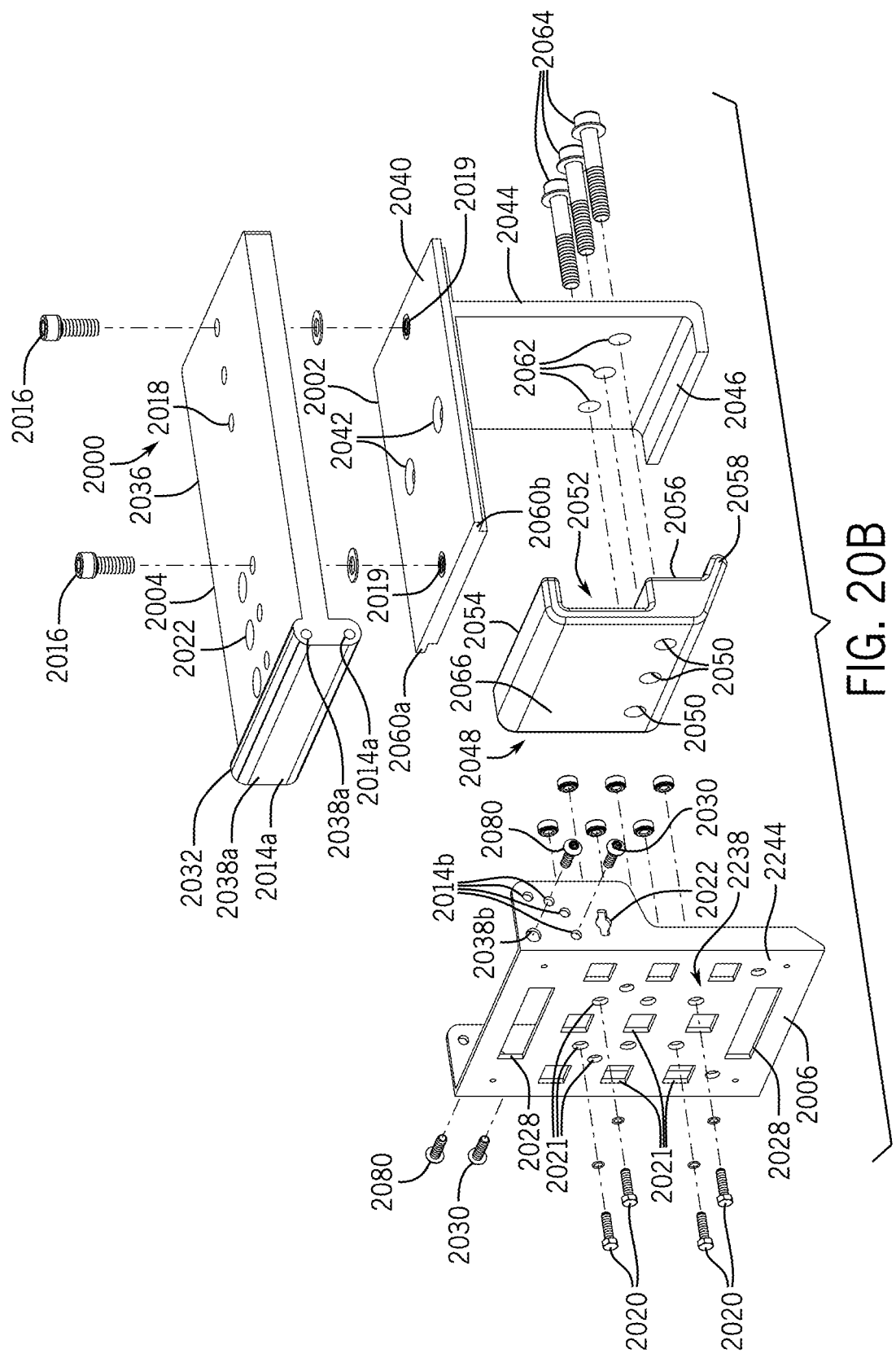
FIG. 20B shows an exploded view of the mounting assembly of FIG. 20A.
Figure 20C:
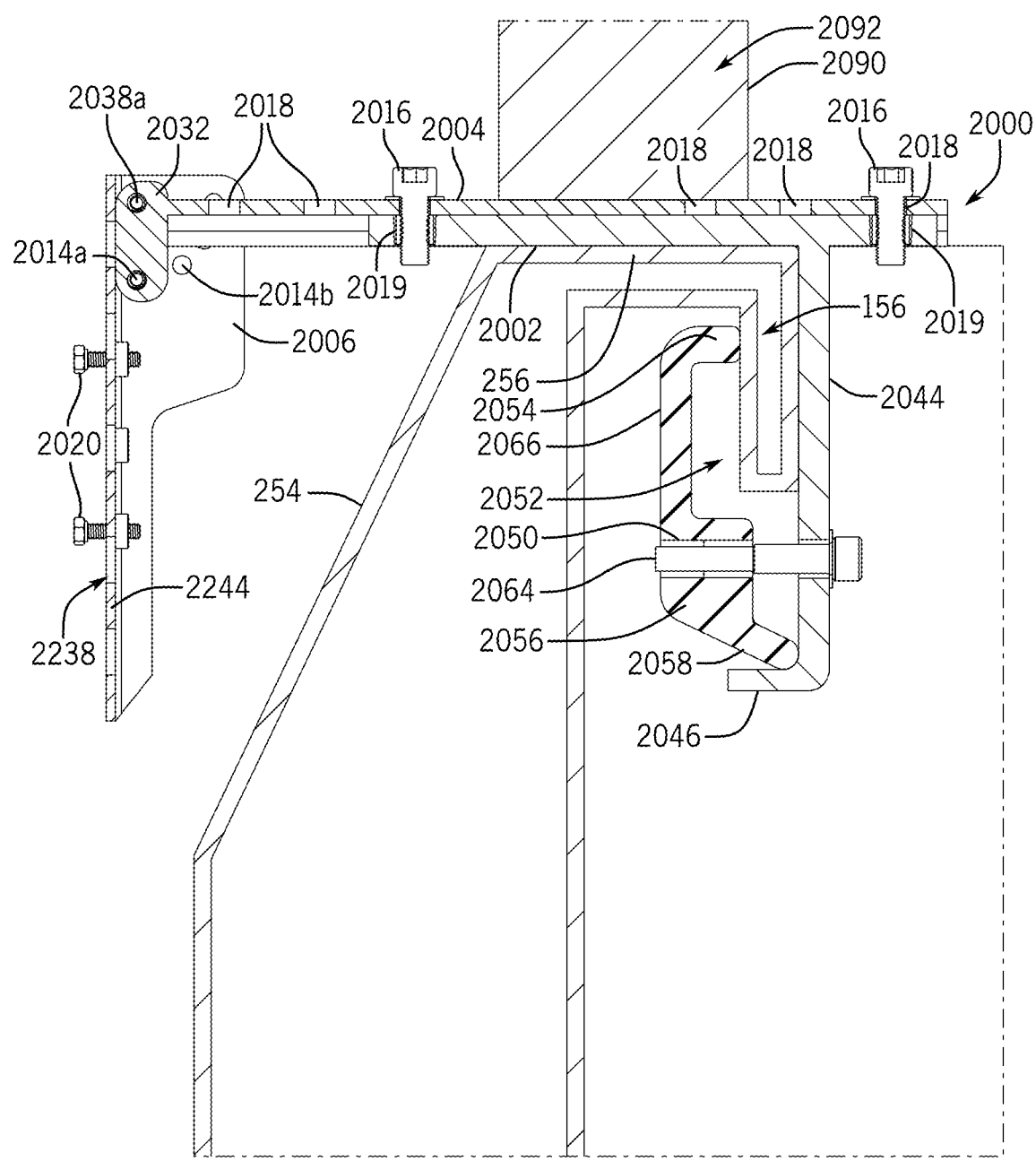
FIG. 20C shows a section view of the mounting assembly of FIG. 20A taken along section line 20C-20C of FIG. 20A.

In this example, as best shown in FIGS. 20A, 20B, 20C, the mounting assembly 2000 includes a carriage assembly 2034 that is adjustable relative to the truck bed to which it is attached. The carriage assembly 2034 includes a bracket 2002 (FIGS. 20B, 20C) on which a carriage 2004 is movably coupled. The bracket 2002 may removably secure the mounting assembly 2000 to the vehicle 150. The carriage assembly 2034 may also include lower portion 2006 adjustably mounted to the carriage 2004, which in turn couples with a load support structure 2242, and in one example is positioned outwardly from the sidewall 154 of the vehicle 150. In one example, the lower portion 2006 may be selectively couplable to coupling portion 2240, such as adapter 2010. The coupling portion 2240 may be separate from or may be integrated into a load support structure 2242 (such as to facilitate the attachment of different types of cargo on the outside of the vehicle body). An adapter 2010 may be useful in that it may facilitate a coupling portion 2240 to attach to a receiving portion 2244 in the event the coupling portion 2240 and receiving portion 2244 may not easily attach together without the adapter 2010.

As best shown in FIG. 20B, the bracket 2002 may be formed of an upper portion 2040, a receiving block 2044 and/or a cleat 2046. The upper portion 2040 may be substantially planar. A clamp 2048 may operably engage with the receiving block 2044 and cleat 2046 to releasably secure the bracket 2002 to the rim 156 of the truck bed 152 without requiring the formation of apertures in the vehicle body, as described below. This is referred to herein as a clamp-bracket structure. Alternately or in combination with the bracket clamp 2048 engagement, a fastener or fasteners may extend through the bracket 2002 and through apertures formed in the rim 156 to secure the bracket to the rim 156 of the truck bed 152.

The use of the clamp 2048, along with the cleat 2046 to secure the bracket 2002 to the truck bed is described with respect to FIGS. 20B and 20C. The receiving block 2044 on the bracket 2002 may extend downwardly from the upper portion 2040. The receiving block 2044 may have a plate-shape, and be as wide, less wide, or more wide than a width of the upper portion. The receiving block 2044 may be integrally formed with or securely attached to the upper portion. The receiving block 2044 may extend downwardly from the upper portion 2040 in a position closely adjacent to, either in contact with or spaced apart from an inside edge of the rim 156 of the sidewall 154 of the pickup truck bed 152. The receiving block 2044 may extend at an angle toward or away from the sidewall of the truck bed 152, based on the physical design of the rim 156 of the truck bed sidewall 154. The angle may range from about 45 degrees towards the sidewall, to about 45 degrees away from the side wall, and may be an angle of about 90 degrees. A cleat 2046 may be coupled to or integrally formed with the receiving block 2044, and may be spaced downwardly from the upper portion 2040 a distance larger than the depth of the rim 156. In some examples the cleat 2046 may be spaced about 2 inches to about 4 inches below the upper portion 2040. The cleat 2046 may be positioned at or near the end of the receiving block 2044. The cleat 2046 may extend at a normal angle with respect to the receiving block 2044, or may be angled upwardly towards the rim 156, or may be angled downwardly away from the rim. In some embodiments, the upper portion 2040 and the cleat 2046 may be substantially parallel with respect to one another.

Referring still to FIGS. 20B and 20C, the mounting assembly 2000 may include an inner clamp body 2048 configured to couple to the bracket 2002. The inner clamp body 2048 may have a flange 2054 and a shoulder 2056 coupled to one another by a web portion 2066. The flange 2054, shoulder 2056, and web portion 2066 may form a channel 2052 in the inner clamp body 2048. A lip 2058 may extend from the shoulder 2056, and may extend away from the web portion 2066 further than the flange 2054. One or more apertures 2050 may be formed in the shoulder 2056 suitable to mount the inner clamp body 2048 to the receiving block 2044. Referring to FIG. 20C, the rim 156 may be securely clamped between the inner clamp body 2048 and the receiving block 2044 when the inner clamp body 2048 is coupled to the bracket 2002 by one or more fasteners 2064. For example, the clamp body 2048 may be positioned with the lip 2058 contacts the receiving block 2044, such as in a transition between the cleat 2046 and the receiving block 2044, and the flange 2054 engaging an inside feature of the rim 156. When the fasteners 2064 are tightened to draw the clamp body 2048 towards the receiving block 2044, the clamp body levers around the contact of the lip 2058 with the receiving block 2044 to create a compressive force at the contact point between the flange 2054 and the inside of the rim 156. A benefit of the inner clamp body 2048 and bracket 2002 may be the ability to mount the mounting assembly 2000 to the vehicle in a removable manner that does not altering the vehicle such as by drilling holes, etc. The channel 2052 may provide a clearance between the rim and the inner clamp body 2048 to accommodate a variety of vehicle types.

Referring to FIG. 20B, alternatively or additionally to the clamp-bracket structure, one or more apertures 2042 may be formed in the upper portion 2040 for use with fasteners 2088 to attach the bracket 2002 to the rim 156. For example, the apertures 2042 may be laterally spaced apart in a middle portion of the upper portion 2040. In the example in FIG. 20D, fasteners 2088, such as threaded bolts, may be positioned through the apertures 2042 and through corresponding apertures in the rim of the pickup bed, and secured therein by corresponding nuts. The apertures 2042 may be countersunk, such that fasteners 2088 received therein are flush with a top surface of the upper portion 2040 so as to not interfere with the slidable movement of the carriage 2004 on the bracket 2002.

Figure 20D:
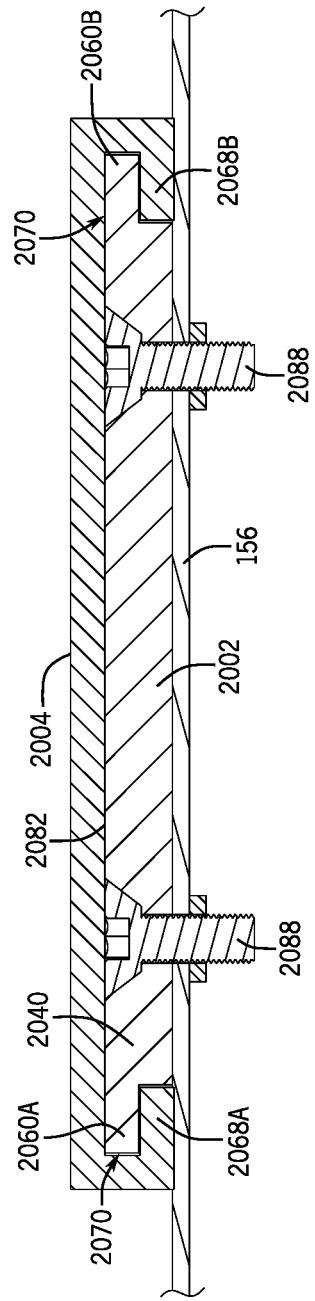
FIG. 20D shows a section view of the mounting assembly of FIG. 20A taken along section line 20D-20D of FIG. 20A.
Figure 20E:
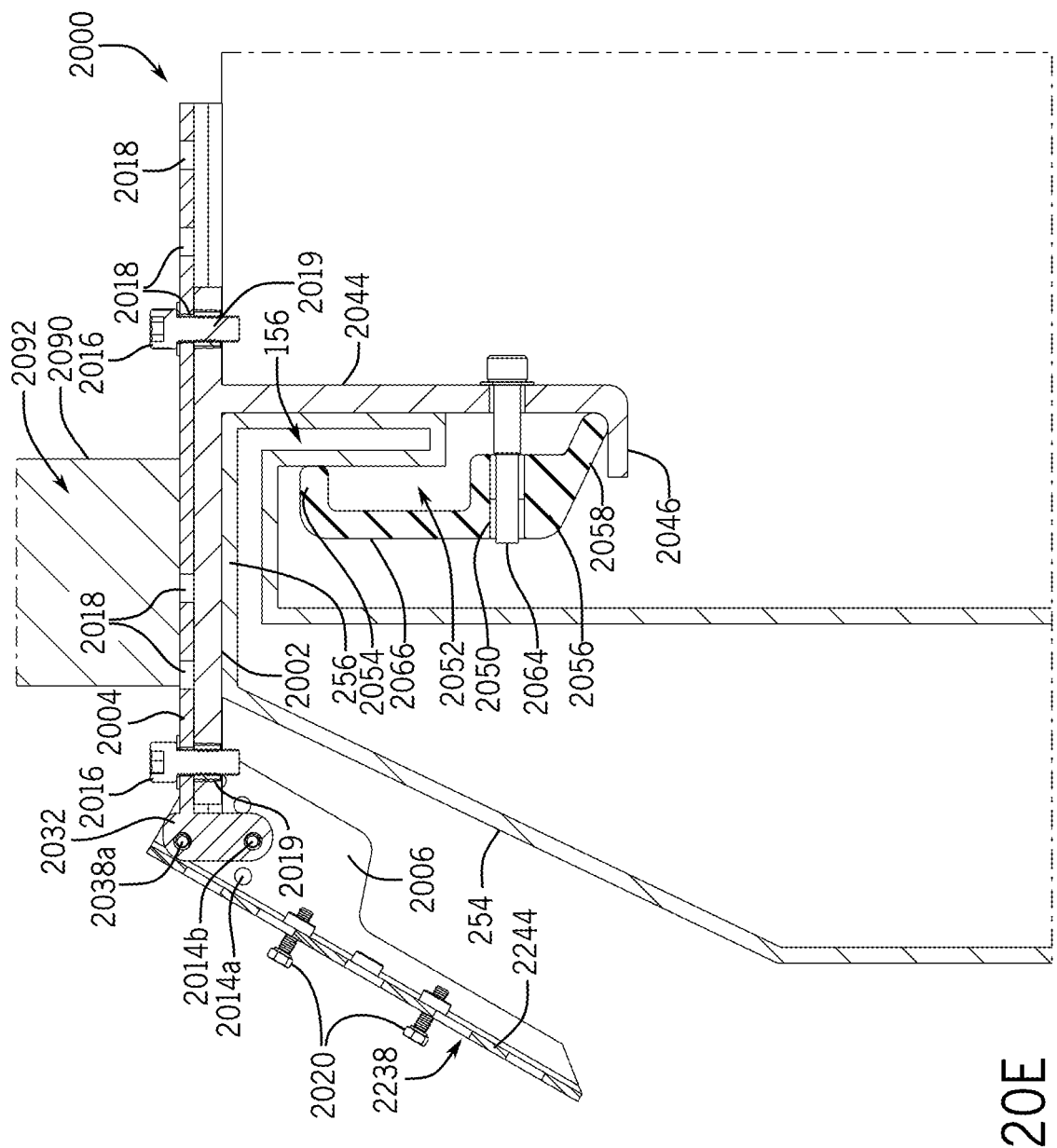
FIG. 20E shows an example of the mounting assembly of FIG. 20A in retracted co configuration.

Referring to FIGS. 20A, 20C, and 20E, carriage 2004 is selectively movably supported upon the bracket 2002. For example the carriage may move outwardly away from the sidewall 154 of the truck bed 152 or inwardly toward the sidewall 154 and the truck bed 152, in order to adjust the location of the lower portion 2006 relative to the sidewall 154. In the example shown, there are two groups of apertures 2018 formed in the carriage 2034. There is one group near each end of the carriage 2034. The apertures 2018 in each group are equally spaced apart and linearly aligned within each group, and the two groups of apertures are linearly aligned with one another. Apertures 2019 are formed in the bracket 2002, with one aperture 2019 positioned adjacent either end of the bracket 2002. The apertures 2019 are spaced apart a distance so that each aperture 2019 aligns with one aperture the group of apertures in the respective end of the carriage 2004 With an aperture 2019 aligned with an aperture 2018 in the carriage 2034, a fastener 2016 (such as a bolt and associated nut) may be positioned through the aligned apertures to removably secure the carriage 2004 to the bracket. With three apertures 2018 in each of the groups of apertures, this provides three relative positions of the carriage 2004 relative to the bracket 2002. In another example, one grouping of apertures 2018 in the carriage 2004 that aligns with an aperture 2019 in the bracket may be replaced by a pin-and-slot structure, requiring the user to loosen only one fastener to adjust the relative positioning of the carriage 2004 with the bracket 2002. More or fewer apertures in the carriage 2004 and/or the bracket may optionally be used, as long as one aperture 2018 in the carriage 2004 aligns with one aperture 2019 in the bracket 2002. Alternatively, other adjustable attachment configurations may be utilized to control the adjustability of the carriage 2004 with the bracket 2002, for example a clamp structure to pinch the carriage 2004 together with the bracket 2002. Alternatively, the carriage 2004 may have only one position with respect to the bracket 2002.

FIG. 20C shows the carriage 2004 positioned in the outward most position of the carriage 2004 relative to the bracket 2002 given the patterns of apertures 2018 in the carriage 2004. One fastener 2018 is positioned in through the inner-most aperture 2018 of each grouping of three apertures. This positions the lower portion 2006 of the carriage assembly 2034 furthest away from the wall 154 of the truck bed 152. FIG. 20E shows the carriage 2004 positioned in the innermost position of the carriage 2004 relative to the bracket 2002 given the patterns of apertures 2018 in the carriage 2004. One fastener 2018 is positioned in through the outer-most aperture 2018 of each grouping of three apertures. This positions the lower portion 2006 of the carriage assembly 2034 closest to the wall 154 of the truck bed 152.

Continuing with reference to FIGS. 20C and 20E, a sidewall 2090 of a topper 2092 mounted on a truck bed 152 is shown. The sidewall 2090 is aligned generally above the sidewall 154 of the bed 154, and is shown as being the same or similar width as the sidewall 154, but may be wider or narrower depending on the design of the topper and the particular truck. The bracket 2002 may be designed such that the ends of the bracket extend beyond opposing walls of the sidewall 154 of the truck bed 152 and the sidewall 2090 of the topper 2092. The aperture 2019 adjacent each end of the bracket 2002 may also be exposed on either side of the topper 2092, such as for example being spaced away from the opposing sidewall 152 of the truck bed 154 and the sidewall 2090 of the topper 2092, as shown in FIGS. 20C and 20E. This allows the fasteners in the apertures 2019 to be accessed to allow adjustment of the carriage 2004 relative to the bracket 2002 inwardly or outwardly relative to the sidewall 154 of the truck bed 152 even with a topper positioned on the truck bed 152, and re-secured in the new position. This allows the mounting assembly 2000 to be adjustable outwardly and inwardly (for example outward away from the sidewall 154, or inward toward the sidewall 154) relative to the truck bed without removing the mounting assembly from the truck bed 152, and/or without removing the topper 2092 from the truck bed 152. The carriage assembly 2034 is also thusly adjustable outwardly and inwardly relative to the sidewall 154 without removing the carriage assembly from the truck bed 152. As shown in FIG. 20E, the lower portion 2006 may be pivoted outwardly about pivot formed between the carriage and the lower portion 2006, and secured in that angled orientation by the adjustment mechanism as described further below.

Where a topper is used on a truck bed 152 that also implements one or more mounting assemblies as described herein, a spacer strip may be positioned on the rim 156 between the one or more mounting assemblies to aid in sealing the topper to the rim 156.

One example of adjustably coupling the carriage 2004 with the bracket 2002 is shown in FIGS. 20B and 20D. The upper portion 2040 of the bracket 2002 may define one or more rails along opposing edges, such as rail 2060*a* and rail 2060*b*. The rails are each spaced above the rim 156 upon which the bracket 2002 is attached. The carriage 2004 may define one or more flanges along opposing edges, such as flange 2068*a* and flange 2068*b* that together form a track 2070. The flanges may be spaced away from a lower face 2082 of the carriage 2004 and extend inwardly, forming a gap 2084 between each flange and the carriage 2004. The rails 2060*a* and 2060*b* fit in the gap 2084 above the respective rails 2068*a*, 2068*b*, and the carriage 2004 may move relative to the bracket 2002, and be laterally held in position by the track 2070.

Benefits of a carriage assembly 2034 including a carriage 2004 movably mounted on the bracket 2002 may include the ability to mount differently sized cargo to a variety of different vehicle 150 shapes and sizes. For example, larger or heavier cargo can be mounted further from the vehicle body such that the cargo is less likely to contact the vehicle body as the vehicle drives. Alternatively or additionally, a benefit of the carriage assembly 2034 may be the ability to adjust the mounting assembly 2000 without removing the carriage assembly 2034 from the truck bed 152, or without disassembling the carriage assembly 2034, or without removing a bed topper 2092 from the truck bed 152, should one be installed over the mounting assembly 2000.

As shown in FIG. 20A, the lower portion 2006 of the mounting assembly 2000 may be pivotally coupled to the carriage 2004 via a pivot 2012. The pivot 2012 may have the benefit of enabling the lower portion 2006 to be positionable in different angles (a, shown e.g., in FIG. 20C) with respect to the carriage 2004 to accommodate differently sized cargo, accessories, or vehicle types/sizes.

With reference to FIGS. 20A and 20B, the carriage 2004 may have a body portion 2036 and a head portion 2032 disposed at one end portion of the body portion 2036. The body portion 2036 may define a substantially planar body, plate, or structure. The body portion 2036 may have formed therein one or more apertures 2018, as referenced above. In one example, the head portion 2032 may have a body 2033 that extends across the lateral width of the body portion 2036, and that may extend away from both opposing surfaces of the carriage 2034, forming a general T-shape in combination with the body portion 2036. In one example as shown in FIG. 20C the head portion 2032 protrudes above a top surface of the carriage, and protrudes below the opposite bottom surface of the carriage 2034, defining a long dimension of the head portion. The head portion 2032 may have one or more pivot apertures 2038a and 2038b (one at each end of the head portion) and/or one or more adjustment apertures 2014a formed therein. The pivot aperture 2038a may be positioned adjacent a top of the head portion 2032. In one example the pivot aperture 2038a is in the upwardly protruding portion of the head portion 2032. The adjustment aperture 2014a may be positioned adjacent a bottom of the head portion 2032. In one example the adjustment aperture 2014a is in the downwardly protruding portion of the head portion 2032. The pivot aperture 2038a and adjustment aperture 2014a may extend at least partially into or all the way through the head portion 2032, for example in a lateral or width direction relative to the length of the carriage 2004.

Referring to FIGS. 20A, B, and F, the lower portion 2006 may have a U-shaped cross section configured to receive the head portion 2032 of the carriage 2004. For example, the lower portion 2006 may be formed of a transverse web 2078 that extends between two legs or flanges 2076 that extend away from the web 2078 at an angle, such as for example 90°. The legs 2076 may have one or more apertures formed therein. For example, the legs 2076 may have a pivot aperture 2038b, one or more adjustment aperture 2014b, and/or a security aperture 2022 formed therein. The legs 2076 and apertures formed therein may be substantially mirrored between the two legs 2076. The web 2078 may have one or more apertures 2021 that form the receiving portion 2244 of the mounting assembly 2000, which connects with the coupling portion 2240 of a load support structure 2242. The receiving portion 2244 may define the engagement location 2238 as being at or below the rim 156 of the sidewall 154. One or more windows 2028 may be formed in the web 2078. The window 2028 (for example a relatively large aperture) may be configured to lighten the lower portion 2006, while maintaining structural integrity of the lower portion 2006.

Figure 20F:
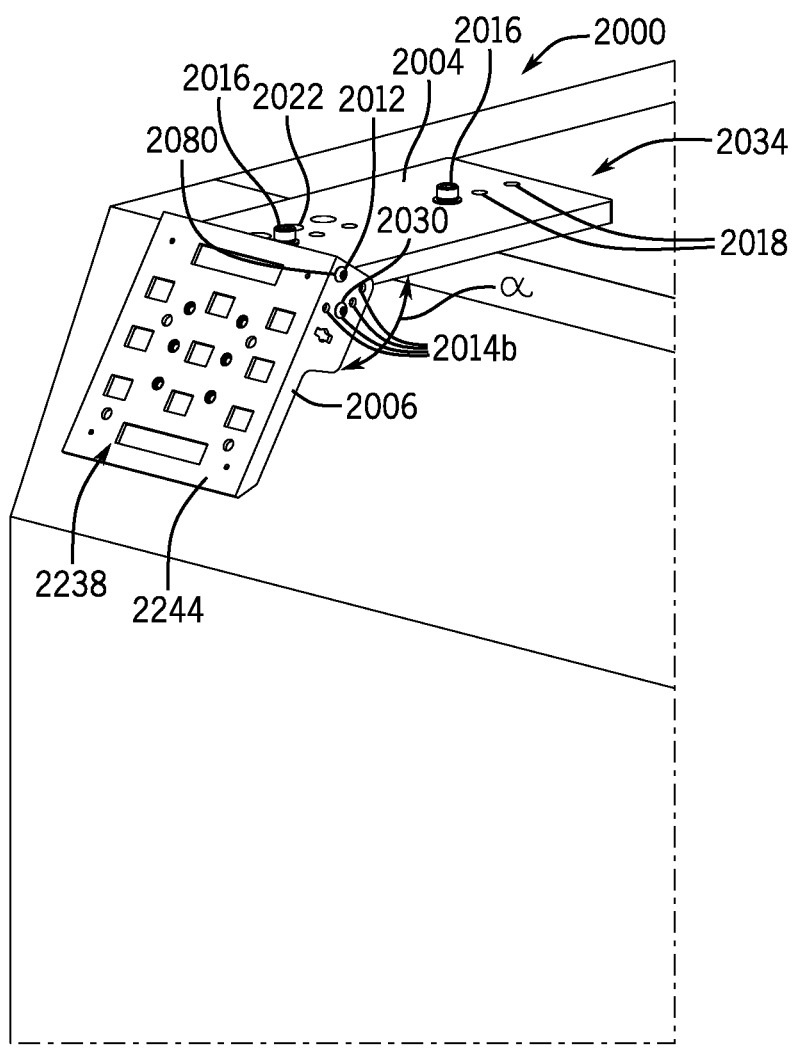
FIG. 20F shows the example of the mounting assembly of FIG. 20A in a second configuration.

With continued reference to FIGS. 20A and 20F, the adjustment apertures 2014b may be configured to enable the lower portion 2006 to be selectively secured at different angles α with respect to the carriage 2004. As shown in FIGS. 20A, 20B, 20C, 20E, and 20F, the adjustment apertures 2014b may be one or more discrete apertures such that the angles α are predetermined and fixed. The adjustment apertures 2014b may be arranged in an arcuate or other pattern. In other embodiments, the adjustment aperture 2014b may be a curved slot that enables continuous adjustment of the angles α. The lower portion 2006 and the carriage 2004 may be coupled by aligning the pivot aperture 2038a in the head portion 2032 of the carriage 2004 with the pivot aperture 2038b of the legs 2076. A pivot pin 2080 may be received through the pivot aperture 2038a and the pivot aperture 2038b. In some embodiments, a single pivot pin 2080 may extend through the width of the body of the head portion 2032. In other embodiments, two pivot pins 2080, one at each end of the head portion, maybe used to couple the respective legs 2076 to the head portion 2032. The pivot pin 2080 may be a bolts, crew or the like, or may be a pin fixed to or formed with the lower portion 2006. The adjustment aperture 2014a may be aligned with one of the adjustment apertures 2014b and secured with a lock pin 2030. As with the pivot pin 2080, the lock pin 2030 may be a single lock pin that extends through substantially a width of the head portion 2032, or may be two lock pins 2030, one at each end of the head portion. The adjustment aperture 2014b may be selected to achieve a desired angle between the carriage 2004 and the lower portion 2006.

Figure 20G:
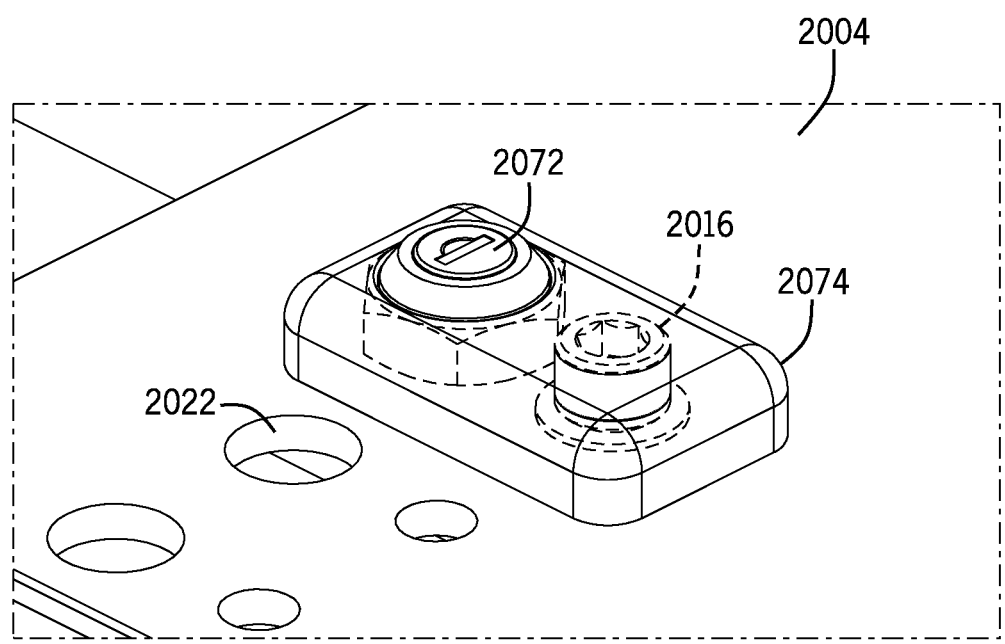
FIG. 20G shows a locking assembly for use with the mounting assemblies disclosed herein.

As shown in FIG. 20B and FIG. 20G, the security aperture 2022 may be positioned near a fastener connecting parts of the mounting assembly together in order to obstruct the removal of the fastener, and deter theft. In FIG. 20A, a security aperture 2022 is adjacent the aperture 2018 in the carriage 2004, and another security aperture 2022 is positioned on the leg 2076 near adjustment aperture 2014b. The security apertures 2022 may be configured to receive a locking mechanism 2072 to reduce or prevent tampering with the mounting assembly 2000. In one example, such as the security aperture 2022 near the adjustment aperture 2014b, the security aperture may have a central portion 2026 (for example a round central portion 2026). The security aperture 2022 may have one or more keyways 2024 extending outward from the central portion 2026. The keyways 2024 may receive a locking mechanism such as a key lock and prevent or limit rotation of the locking mechanism when in the locked position. As shown in FIG. 20G, with the security aperture 2022 positioned near aperture 2018, a security cover 2074 may be secured via the locking mechanism 2072 over one or more fasteners such as the fastener 2016 to reduce or prevent tampering with, or theft of, the mounting assembly 2000. Multiple portions of the mounting assembly 2000 may be secured to one another with the locking mechanism 2072 and security cover 2074.

With reference to FIG. 21, a mounting assembly 2100 is disclosed. The mounting assembly 2100 may be similar to the mounting assembly 2000 in many aspects and may have similar benefits. For example, the mounting assembly 2100 may have a lower portion 2006 and a carriage assembly 2034 as described herein. The carriage assembly 2034 may include a carriage 2004 and a bracket 2102 as described above, except the bracket 2012 may not include a clamp structure for engaging the rim 256 of the sidewall 254. Instead, the bracket 2102 includes the upper portion 2040 that slidably receives the carriage 2004 as described with respect to FIG. 20D above. The adjustable interface between the carriage and the bracket 2102 may be the same or similar as that described with respect to FIGS. 20A-20G. This example of the bracket 2102 may be useful with some vehicles, such a light-weight pickup trucks which sometimes do not have a traditional rim 256 the sidewall 254 of the truck bed 252, and may not be suitable for use with a mounting assembly 2000 that includes a clamp structure. Thus, a mounting assembly 2100 may use one or more fasteners 2104 (e.g., countersink screws, pins, rivets, etc.) received in apertures 2042 formed in the bracket 2102. The fasteners 2104 may be directly coupled to the vehicle such as by direct threading into the body of the vehicle, such as the rim 256, or may be coupled via a backing nut, or the like.

With reference to FIG. 22A, a mounting assembly 2200 is disclosed. The mounting assembly 2200 may be similar to the mounting assembly 2000 and the mounting assembly 2200 in many aspects and may have similar benefits. For example, the mounting assembly 2200 may have a lower portion 2006 and a carriage assembly 2034 as described herein. The carriage assembly 2034 may include a carriage 2004 and a bracket 2102 as described above, except the bracket 2012 may not include a clamp structure for engaging the rim 256 of the sidewall 254. The carriage 2004 may interface (for example, slidably via a track 2070) with a bracket 2202 couplable to the vehicle. The bracket 2202 may have a substantially planar upper portion 2210. An upper web portion 2204 may extend from the upper portion 2210 at an angle therefrom (for example approximately 90°) from the upper portion 2040. A second mid-web portion 2206 may extend back toward the vehicle from the upper web portion 2204. The second mid-web portion 2206 may be disposed at an angle with respect to the upper web portion 2204, for example at about 135°. A mounting flange 2208 may extend from the angled portion 2206, such as in a downward direction. The mounting flange 2208 may be positioned against or adjacent to the sidewall 254 of the truck bed 252 in order to be attached thereto by fasteners. The mounting flange 2208, in one example, may include one or more apertures 2062 configured to receive fasteners 2064 adapted to secure the mounting flange 2208 to the sidewall 254 of the vehicle. As with the mounting assembly 2100, the mounting assembly 2200 may not need to be secured to the rim 256 of the sidewall 254. The mounting assembly 2200 may have the advantage of being compatible with vehicles such as light-weight pickup trucks that do not have a traditional rim on the bed.

Although the present invention has been described with a certain degree of particularity, it is understood the disclosure has been made by way of example, and changes in detail or structure may be made without departing from the spirit of the invention as defined in the appended claims.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

The invention claimed is:

1. A mounting system for removably attaching components to a vehicle having a bed portion, the bed portion including at least one sidewall defining a top rim, the mounting system comprising:
   a mounting assembly configured to be secured to the sidewall and to support a load;
   wherein;

the mounting assembly defines an engagement location to selectively receive a load or a load support structure configured to couple to the mounting assembly;
the engagement location is positioned at or below the top rim of the sidewall and outside of the sidewall;
the mounting assembly further comprises:
a bracket, the bracket including:
a top portion configured to be secured to the sidewall,
a lower portion defining one or more receiving portions at the engagement location, the one or more receiving portions defining one or more features to support the load or the load support structure, and
an intersection portion defining a location where the top portion and lower portions intersect, where the intersection portion is reinforced by a structure, the structure spanning from the top portion to the lower portion of the bracket.

2. The mounting assembly of claim 1, wherein the lower portion comprises a brace member defining a supporting feature extending from the lower portion in a direction of the sidewall.

3. The mounting assembly of claim 1, where the intersection portion is adjustable to change a position of the lower portion relative to a position of the top portion.

4. The bracket of claim 1, wherein the top portion defines apertures, the apertures configured to receive fasteners, the fasteners configured to secure the bracket to the sidewall.

5. The mounting assembly of claim 1, wherein the load support structure defines one or more utility portions, the utility portion configured to support the load.

6. The mounting assembly of claim 1, wherein the load support structure further includes:
one or more utility portions configured to support the load, and
one or more coupling portions configured to mate with the receiving portion of one or more brackets.

7. The mounting assembly of claim 6, wherein the load support structure spans between two or more mounting assemblies.

8. The mounting assembly of claim 1, the mounting assembly comprising:
a securement mechanism configured to secure the mounting assembly to the sidewall.

9. The mounting system of claim 1,
wherein the load support structure includes one or more utility portions and one or more coupling portions, the coupling portion removably connects the load support structure to the bracket of the mounting assembly.

10. The mounting system of claim 1,
wherein the lower portion extends outside the sidewall of the bed portion and at least partially below the top rim of the sidewall.

11. A mounting system for removably attaching components to a vehicle having a bed portion, the bed portion including at least one sidewall defining a top rim, the mounting system comprising:
a mounting assembly configured to be secured to the sidewall and to support a load;
a load, or a load support structure configured to couple to the mounting assembly;
an engagement between the mounting assembly and the load or the load support structure being positioned at or below the top rim of the sidewall;
wherein the mounting assembly comprises:
a bracket including:
a top portion configured to be secured to the sidewall,
a lower portion defining one or more receiving portions, the one or more receiving portions defining one or more features to support the load or the load support structure,
an intersection portion defining a location where the top portion and lower portions intersect, and
an adjustment mechanism, the adjustment mechanism including:
a top plate defining at least one adjustment aperture,
a bottom plate defining at least one corresponding adjustment aperture, wherein the top portion of the bracket defines at least one corresponding adjustment aperture,
an elongated recess defined between the top plate and the bottom plate configured to receive the top portion of the bracket, wherein by orienting the at least one adjustment aperture of the top portion of the bracket with the at least one corresponding adjustment aperture of the bottom plate and the at least one adjustment aperture of the top plate and inserting at least one fastener, the bracket is secured in at least one position relative to the sidewall.

12. The bracket of claim 11, wherein the at least one adjustment aperture of the top portion of the bracket is laterally spaced from the sidewall.

13. A mounting system for removably attaching components to a vehicle having a bed portion, the bed portion including at least one sidewall defining a top rim, the mounting system comprising:
a mounting assembly configured to be secured to the sidewall and to support a load;
a load, or a load support structure configured to couple to the mounting assembly;
an engagement between the mounting assembly and the load or the load support structure being positioned at or below the top rim of the sidewall;
wherein the mounting assembly comprises:
a bracket, the bracket including:
a top portion configured to be secured to the sidewall,
a lower portion defining one or more receiving portions, the one or more receiving portions defining one or more features to support the load or the load support structure,
an intersection portion defining a location where the top portion and lower portions intersect; and
a securement mechanism configured to secure the mounting assembly to the sidewall, wherein the securement mechanism removably couples to the sidewall, the securement mechanism further comprising:
at least one slider member configured to be positioned in at least one aperture defined by the top portion of the bracket, the at least one slider member further defining an aperture,
a clamp member configured to couple to a feature on the sidewall and further defining an aperture, and
a rod configured to extend through the aperture in the clamp member and into the aperture in the slider member, a fastener coupled to the rod and causing the rod to engage the slider member to exert force on the top portion of the bracket and the clamp member to exert force on the sidewall, thereby securing the mounting assembly to the sidewall.

14. The mounting assembly of claim 13, wherein the at least one aperture of the top portion of the bracket defines at least one track allowing multiple positions to receive the slider member, and
a location of the bracket is selectively adjusted relative to the sidewall and secured at a location when the slider member exerts an applied force on the top portion of the bracket through the at least one track.

15. A mounting system for removably attaching components to a vehicle having a bed portion, the bed portion including at least one sidewall defining a top rim, the mounting system comprising:
a mounting assembly configured to be secured to the sidewall and to support a load;
a load or a load support structure configured to couple to the mounting assembly;
an engagement between the mounting assembly and the load or the load support structure being positioned at or below the top rim of the sidewall;
wherein the mounting assembly comprises:
a bracket, the bracket including:
a top portion configured to be secured to the sidewall,
a lower portion defining one or more receiving portions, the one or more receiving portions defining one or more features to support the load or the load support structure,
an intersection portion defining a location where the top portion and lower portions intersect; and
a securement mechanism configured to secure the mounting assembly to the sidewall, the securement mechanism comprising:
a multi-layer assembly including:
a bottom plate configured to couple with the rim of the sidewall and defining one or more securement apertures,
a top plate defining:
one or more securement apertures,
a recess between the top plate and the bottom plate to receive the top portion of the bracket, and
one or more adjustment apertures aligned above the recess,
wherein one or more fasteners inserted into the one or more securement apertures couple the multi-layer assembly to the sidewall, and one or more fasteners inserted into the one or more adjustment apertures secure the bracket within the multi-layer assembly.

16. The mounting assembly of claim 15, wherein selectively aligning the one or more adjustment apertures with the one or more securement apertures selectively secures the bracket in at least one of multiple positions relative to the sidewall.

17. A mounting system for removably attaching components to a vehicle having a bed portion, the bed portion including at least one sidewall defining a top rim, the mounting system comprising:
a mounting assembly configured to be secured to the sidewall and to support a load;
a load or a load support structure configured to couple to the mounting assembly;
an engagement between the mounting assembly and the load or the load support structure being positioned at or below the top rim of the sidewall;
wherein the mounting assembly comprises:
a bracket including:
a top portion configured to be secured to the sidewall,
a lower portion defining one or more receiving portions, the one or more receiving portions defining one or more features to support the load or the load support structure,
an intersection portion defining a location where the top portion and lower portions intersect, and
an adjustment mechanism including:
at least one slider member positioned within a corresponding at least one aperture defined by the top portion of the bracket,
wherein the corresponding at least one aperture defines at least one track, the at least one track allowing multiple positions for the at least one slider member to be received within the at least one track, and
wherein a placement of the bracket is adjusted relative to the sidewall and secured into the location when the at least one slider member exerts an applied force on the top portion of the bracket through the at least one track.

18. The mounting assembly of claim 17, wherein the at least one slider member and the at least one track each define corresponding teeth that engage to position the at least one slider member on the at least one track.

* * * * *